(12) United States Patent
Kanda et al.

(10) Patent No.: US 9,329,363 B2
(45) Date of Patent: May 3, 2016

(54) IMAGING LENS AND IMAGING APPARATUS EQUIPPED WITH THE IMAGING LENS

(71) Applicant: FUJIFILM Corporation, Tokyo (JP)

(72) Inventors: Hideo Kanda, Saitama-ken (JP); Motoari Ota, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/577,021

(22) Filed: Dec. 19, 2014

(65) Prior Publication Data
US 2015/0177492 A1 Jun. 25, 2015

(30) Foreign Application Priority Data

Dec. 20, 2013 (JP) ................................. 2013-264186

(51) Int. Cl.
*G02B 13/04* (2006.01)
*G02B 9/60* (2006.01)
*G02B 13/00* (2006.01)

(52) U.S. Cl.
CPC .............. *G02B 13/0045* (2013.01); *G02B 9/60* (2013.01)

(58) Field of Classification Search
CPC .............................. G02B 13/0045; G02B 9/60
USPC .................................. 359/713, 714, 763, 764
See application file for complete search history.

(56) References Cited

U.S. PATENT DOCUMENTS

| 2012/0087020 A1* | 4/2012 | Tang | G02B 13/0045 359/714 |
| 2012/0212660 A1* | 8/2012 | Tang | G02B 13/0045 348/345 |
| 2012/0262806 A1* | 10/2012 | Huang | G02B 13/0045 359/784 |
| 2013/0088788 A1 | 4/2013 | You | |

* cited by examiner

*Primary Examiner* — Scott J Sugarman
(74) *Attorney, Agent, or Firm* — Young & Thompson

(57) ABSTRACT

An imaging lens is substantially constituted by five lenses, including: a first lens having a positive refractive power and a convex surface toward the object side; a second lens having a biconcave shape; a third lens having a positive refractive power and is of a meniscus shape having a concave surface toward the object side; a fourth lens having a concave surface toward the object side; and a fifth lens having a negative refractive power and is of a meniscus shape having a convex surface toward the object side, provided in this order from the object side. The imaging lens satisfies a predetermined conditional formula.

19 Claims, 16 Drawing Sheets

EXAMPLE 1

EXAMPLE 1

EXAMPLE 4

EXAMPLE 5

EXAMPLE 2

IMAGING LENS AND IMAGING APPARATUS EQUIPPED WITH THE IMAGING LENS

CROSS REFERENCE TO RELATED APPLICATIONS

The present application claims priority under 35 U.S.C. §119 to Japanese Patent Application No. 2013-264186 filed on Dec. 20, 2013. The above application is hereby expressly incorporated by reference, in its entirety, into the present application.

BACKGROUND OF THE INVENTION

1. Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

2. Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. For example, U.S. Patent Application Publication No. 20130088788 proposes an imaging lens with a five lens configuration, constituted by: a first lens having a positive refractive power, a second lens having a negative refractive power, a third lens having a positive refractive power, a fourth lens having a negative refractive power, and a fifth lens having a negative refractive power.

DISCLOSURE OF THE INVENTION

Meanwhile, there is demand for imaging lenses for use in apparatuses which are becoming thinner such as smart phones and tablet terminals to have shorter total lengths. For this reason, there is demand for a further shortening of the total length of the lens in the imaging lens disclosed in U.S. Patent Application Publication No. 20130088788.

The present invention has been developed in view of the foregoing points. The object of the present invention is to provide an imaging lens that can realize a shortening of the total length while being compatible with the higher numbers of pixels in imaging elements. It is another object of the present invention to provide an imaging apparatus equipped with the lens, which is capable of obtaining high resolution photographed images.

An imaging lens of the present invention substantially consists of five lenses, including:

a first lens having a positive refractive power and a convex surface toward the object side;

a second lens having a biconcave shape;

a third lens having a positive refractive power and is of a meniscus shape having a concave surface toward the object side;

a fourth lens having a concave surface toward the object side; and a fifth lens having a negative refractive power and is of a meniscus shape having a convex surface toward the object side, provided in this order from the object side;

the imaging lens satisfying the following conditional formula:

$$0.75 < f/f3 < 1.85 \tag{1}$$

wherein f is the focal length of the entire system, and f3 is the focal length of the third lens.

The optical performance of the imaging lens of the present invention can be further improved by adopting the following favorable configurations.

In the imaging lens of the present invention, it is preferable for the fourth lens to have a negative refractive power.

In the imaging lens of the present invention, it is preferable for the first lens to be of a biconvex shape.

In the imaging lens of the present invention, it is preferable for the fourth lens to be of a meniscus shape having a concave surface toward the object side.

In the imaging lens of the present invention, it is preferable for an aperture stop to be positioned at the object side of the surface of the second lens toward the object side.

In the above case, it is preferable for the aperture stop to be positioned at the image side of the apex of the surface of the first lens toward the object side.

It is preferable for the imaging lens of the present invention to satisfy one or arbitrary combinations of Conditional Formulae (2) through (5), (1-1) through (5-1), (2-2), (4-2), and (5-2) below.

$$0.76 < f/f3 < 1.8 \tag{1-1}$$

$$0.5 < (L5f - L5r)/(L5f + L5r) < 0.9 \tag{2}$$

$$0.52 < (L5f - L5r)/(L5f + L5r) < 0.87 \tag{2-1}$$

$$0.54 < (L5f - L5r)/(L5f + L5r) < 0.85 \tag{2-2}$$

$$-0.33 < (L1f + L1r)/(L1f - L1r) < -0.17 \tag{3}$$

$$-0.31 < (L1f + L1r)/(L1f - L1r) < -0.18 \tag{3-1}$$

$$0 < f \cdot P45 < 0.55 \tag{4}$$

$$0.2 < f \cdot P45 < 0.51 \tag{4-1}$$

$$0.3 < f \cdot P45 < 0.49 \tag{4-2}$$

$$0.5 < f \tan \omega / L5r < 20 \tag{5}$$

$$0.7 < f \tan \omega / L5r < 10 \tag{5-1}$$

$$1 < f \tan \omega / L5r < 5 \tag{5-2}$$

wherein f is the focal distance of the entire system, f3 is the focal length of the third lens, L1f is the paraxial radius of curvature of the surface of the first lens toward the object side, L1r is the paraxial radius of curvature of the surface of the first lens toward the image side, L5f is the paraxial radius of curvature of the surface of the fifth lens toward the object side, L5r is the paraxial radius of curvature of the surface of the fifth lens toward the image side, ω is half the maximum angle of view when focused on an object at infinity, and P45 is the refractive power of an air lens formed between the surface of the fourth lens toward the image side and the surface of the fifth lens toward the object side, the refractive power of the air lens being obtained by Formula (P) below:

$$P45 = \frac{1-Nd4}{L4r} + \frac{Nd5-1}{L5f} - \frac{(1-Nd4)\times(Nd5-1)\times D9}{L4r \times L5f} \quad (P)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

Note that in the imaging lens of the present invention, the expression "substantially consists of five lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the five lenses.

Note also that the shapes of the surfaces of the lenses and the signs of the refractive indices thereof are considered in the paraxial region in the case that the lenses include aspherical surfaces. The signs of the refractive indices are positive for surfaces having convex surfaces toward the object side, and negative for surfaces having convex surfaces toward the image side.

An imaging apparatus of the present invention is equipped with the imaging lens of the present invention.

According to the imaging lens of the present invention, the configuration of each lens element is optimized within a lens configuration having five lenses as a whole, and the shapes of the first lens through the fifth lens are favorably configured in particular. Therefore, a lens system that can achieve a short total length while being compatible with an increased number of pixels of imaging elements can be realized.

The imaging apparatus of the present invention is equipped with the imaging lens of the present invention. Therefore, the apparatus size of the imaging lens in the direction of the optical axis can be shortened, and the imaging apparatus of the present invention is capable of obtaining high resolution photographed images.

BEST MODE FOR CARRYING OUT THE INVENTION

Hereinafter, embodiments of the present invention will be described in detail with reference to the attached drawings.

Figure 1:
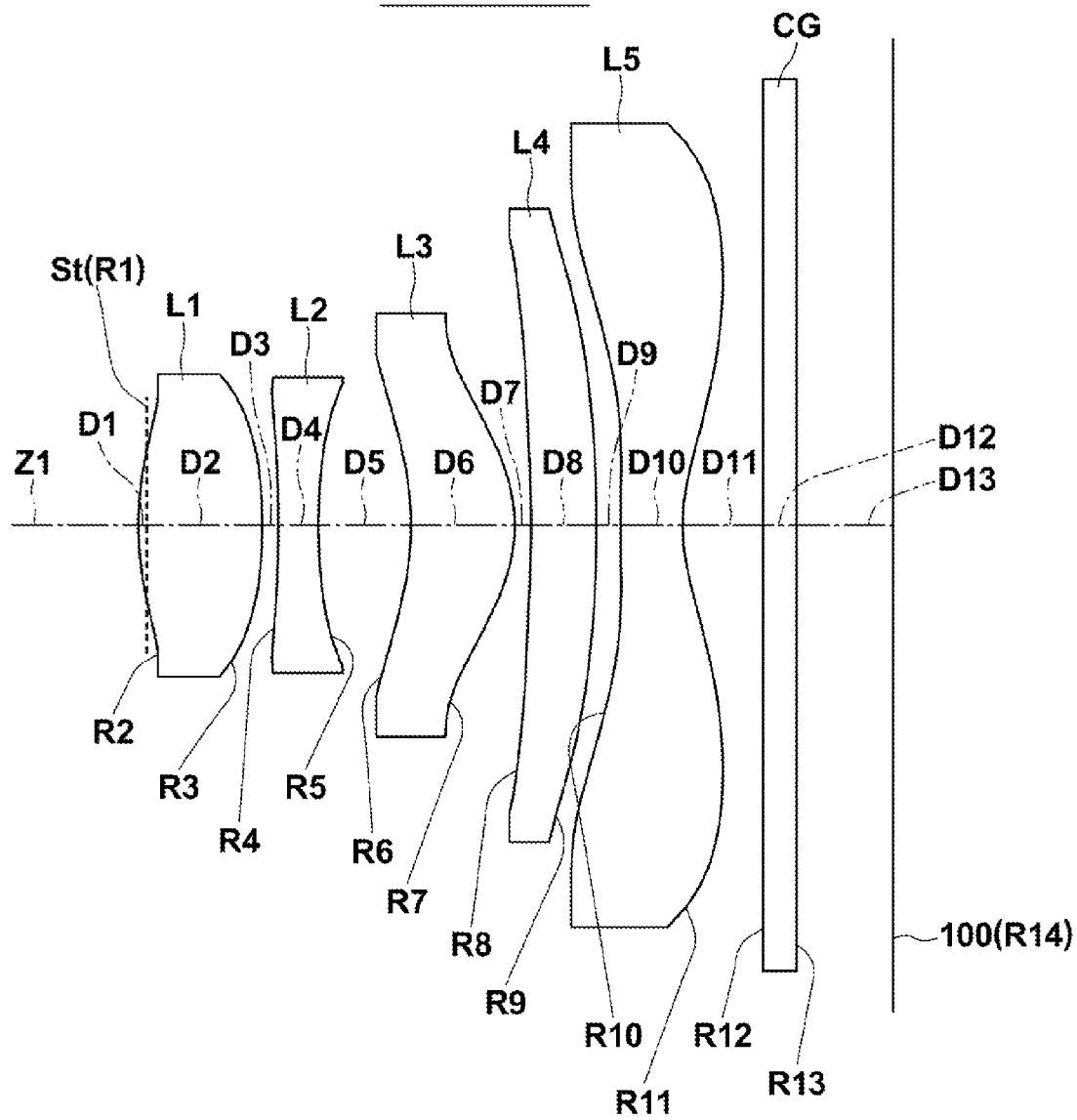
FIG. 1 is a sectional diagram that illustrates a first example of the configuration of an imaging lens according to an embodiment of the present invention, and corresponds to a lens of Example 1.
Figure 2:
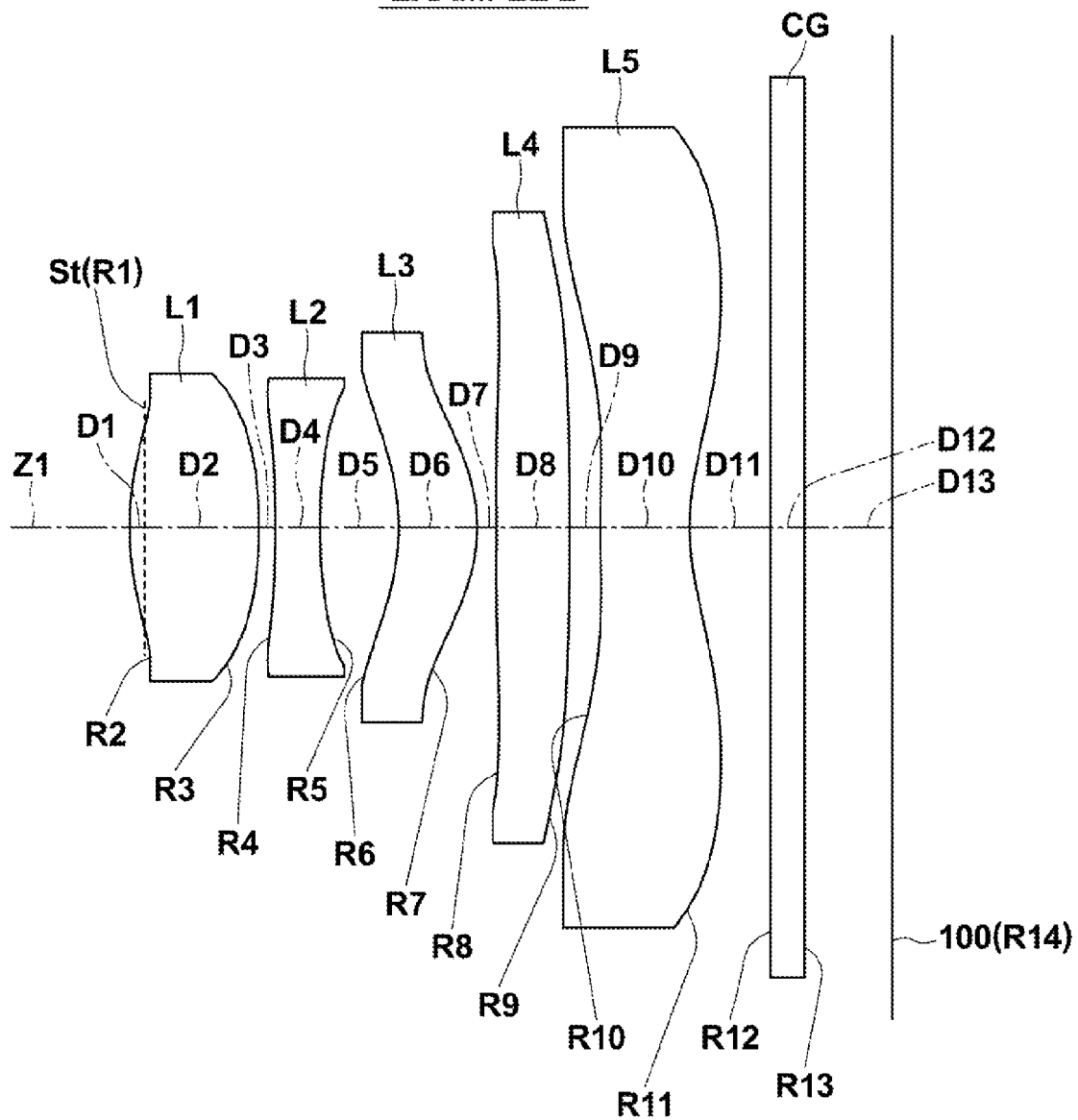
FIG. 2 is a sectional diagram that illustrates a second example of the configuration of an imaging lens according to an embodiment of the present invention, and corresponds to a lens of Example 2.
Figure 3:
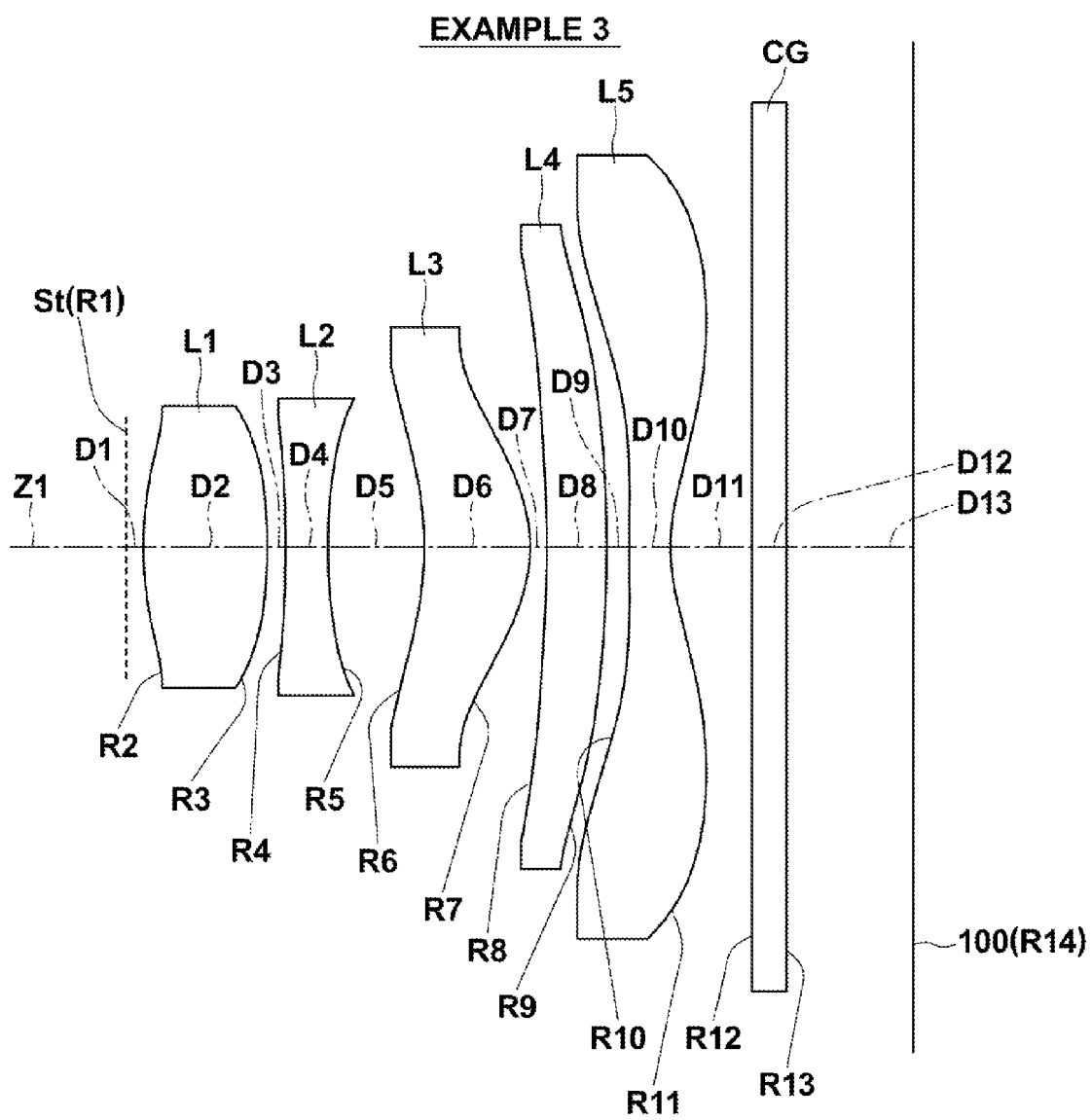
FIG. 3 is a sectional diagram that illustrates a third example of the configuration of an imaging lens according to an embodiment of the present invention, and corresponds to a lens of Example 3.
Figure 4:
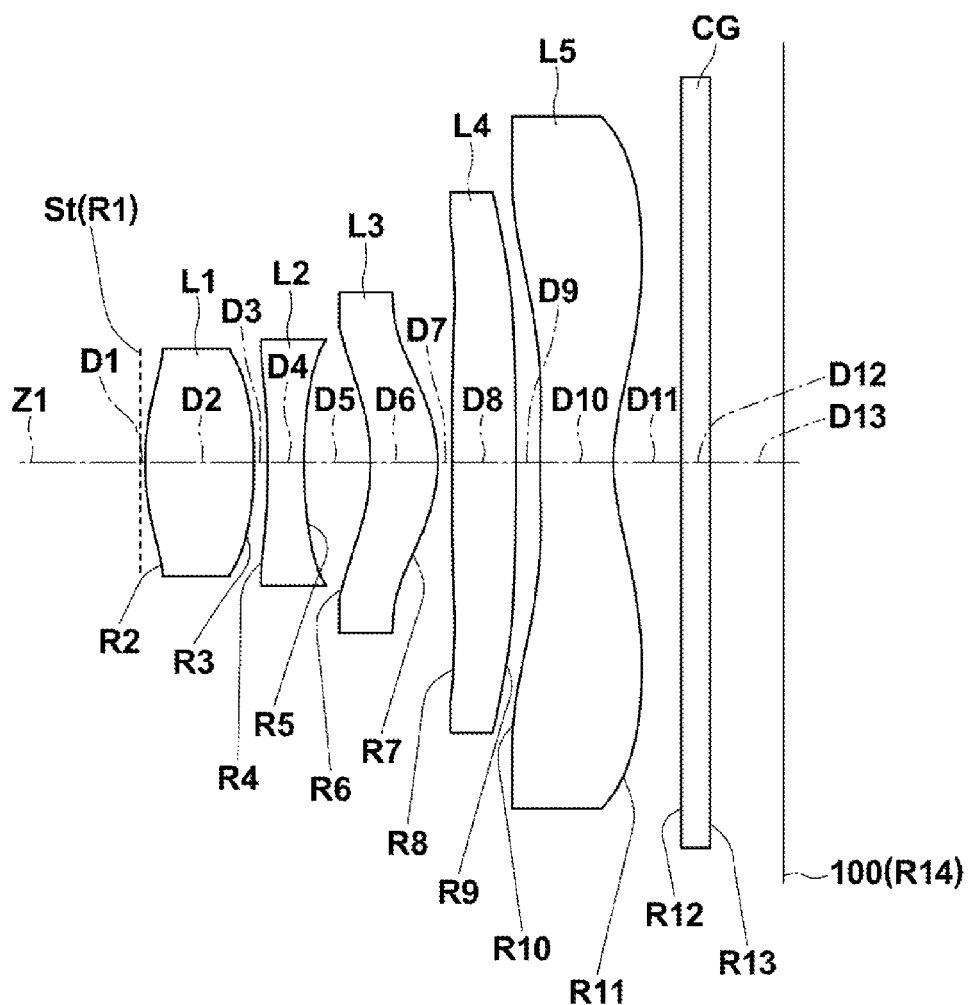
FIG. 4 is a sectional diagram that illustrates a fourth example of the configuration of an imaging lens according to an embodiment of the present invention, and corresponds to a lens of Example 4.
Figure 5:
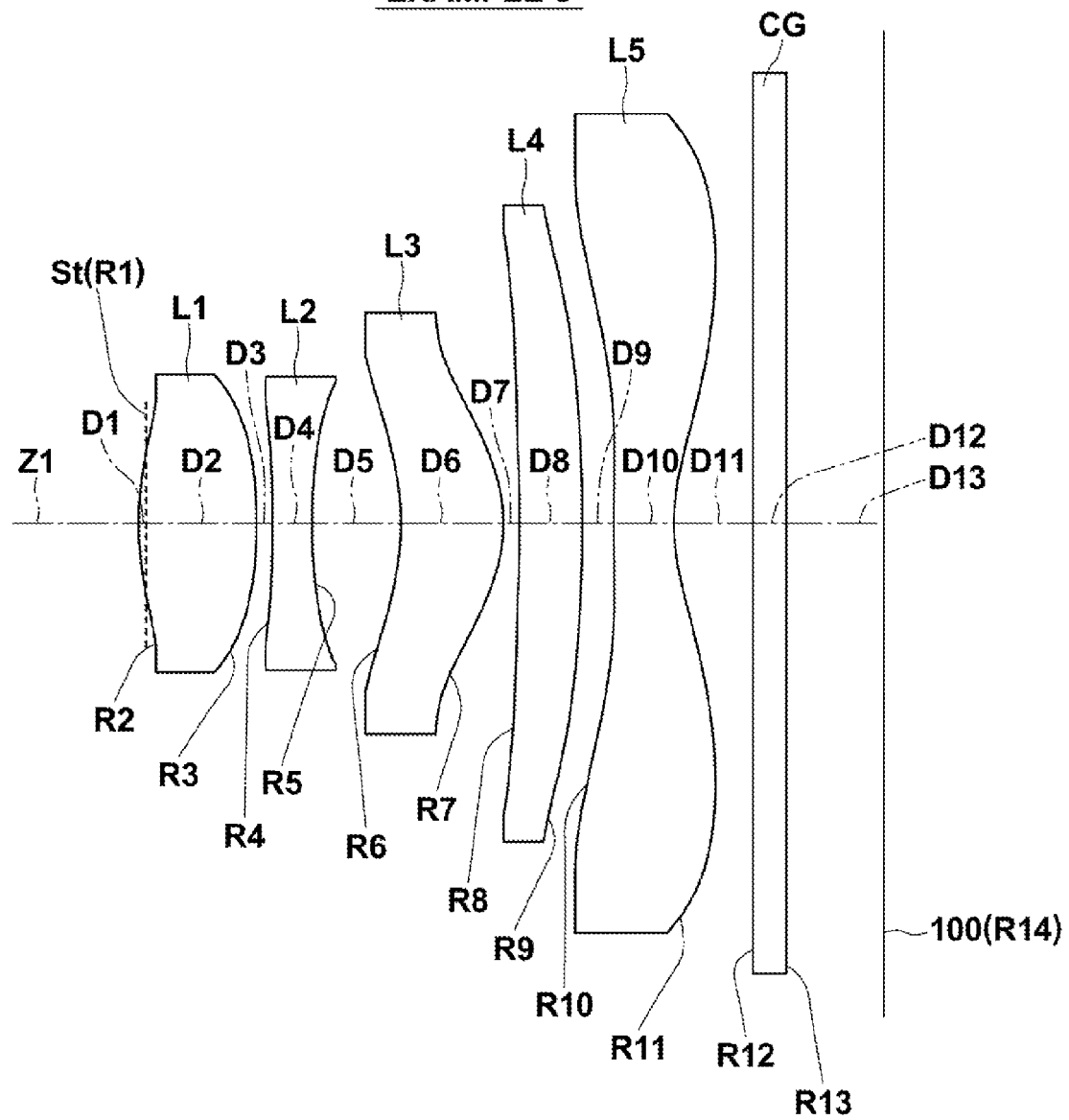
FIG. 5 is a sectional diagram that illustrates a fifth example of the configuration of an imaging lens according to an embodiment of the present invention, and corresponds to a lens of Example 5.
Figure 6:
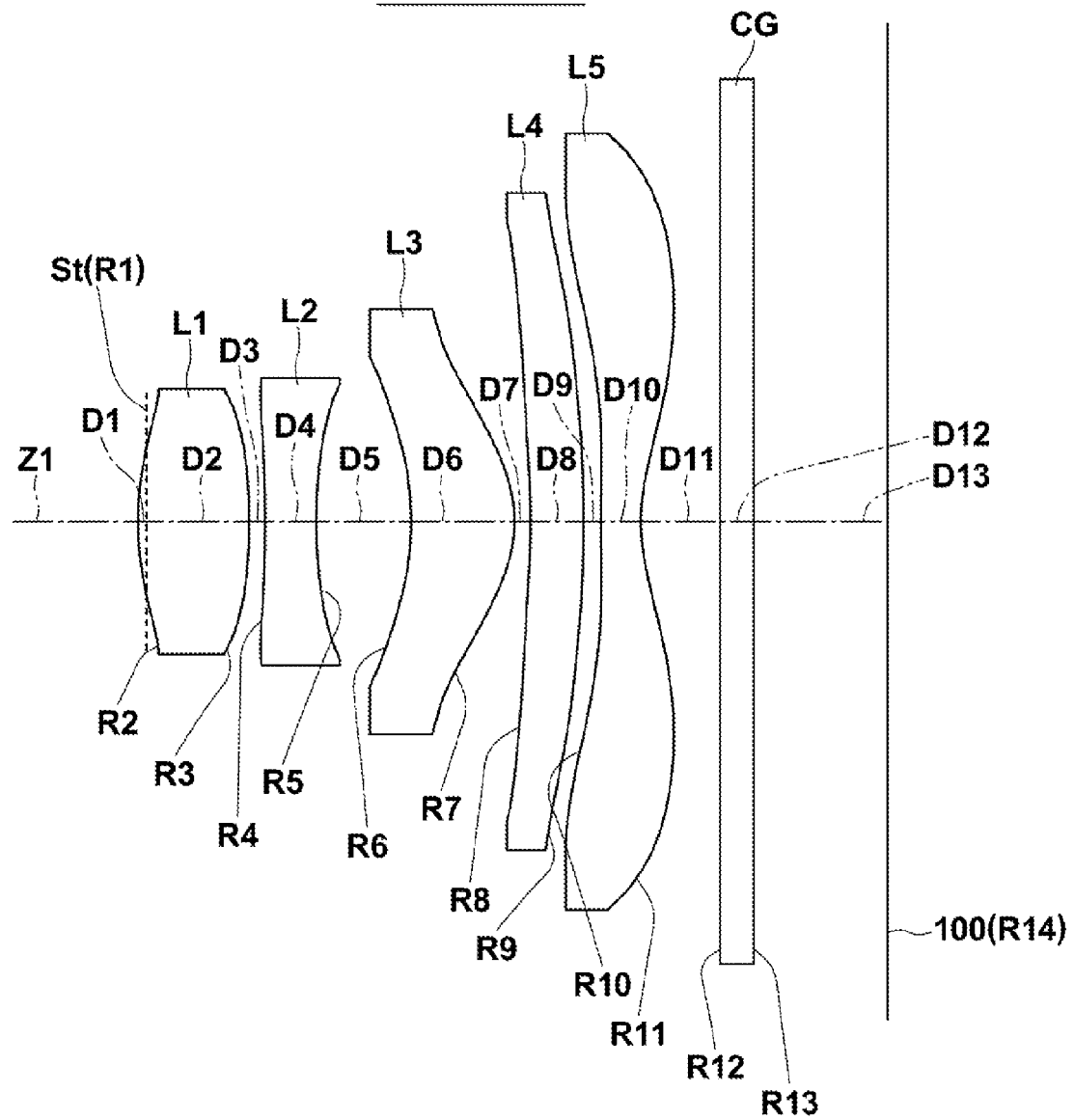
FIG. 6 is a sectional diagram that illustrates a sixth example of the configuration of an imaging lens according to an embodiment of the present invention, and corresponds to a lens of Example 6.
Figure 7:
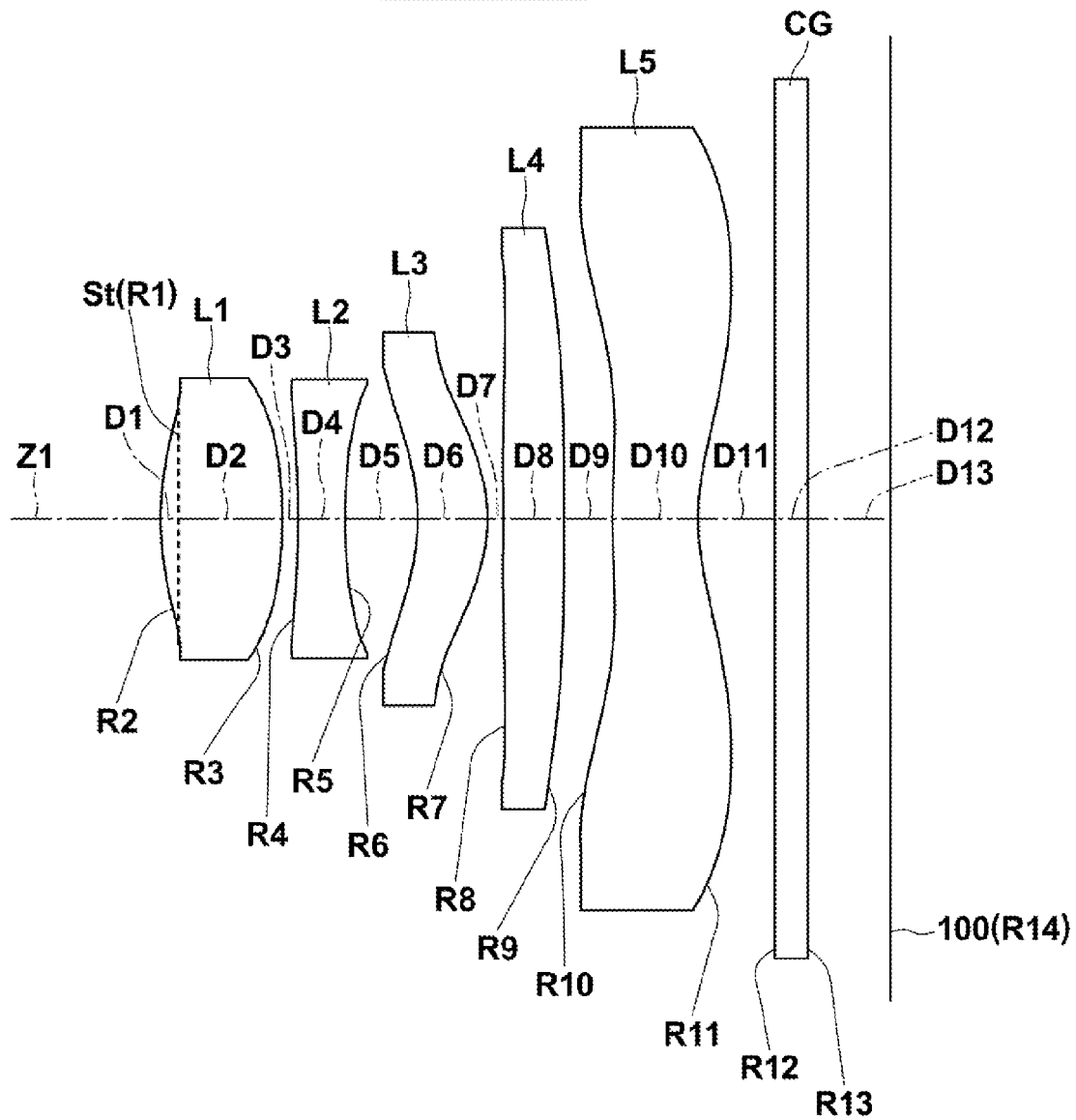
FIG. 7 is a sectional diagram that illustrates a seventh example of the configuration of an imaging lens according to an embodiment of the present invention, and corresponds to a lens of Example 7.
Figure 8:
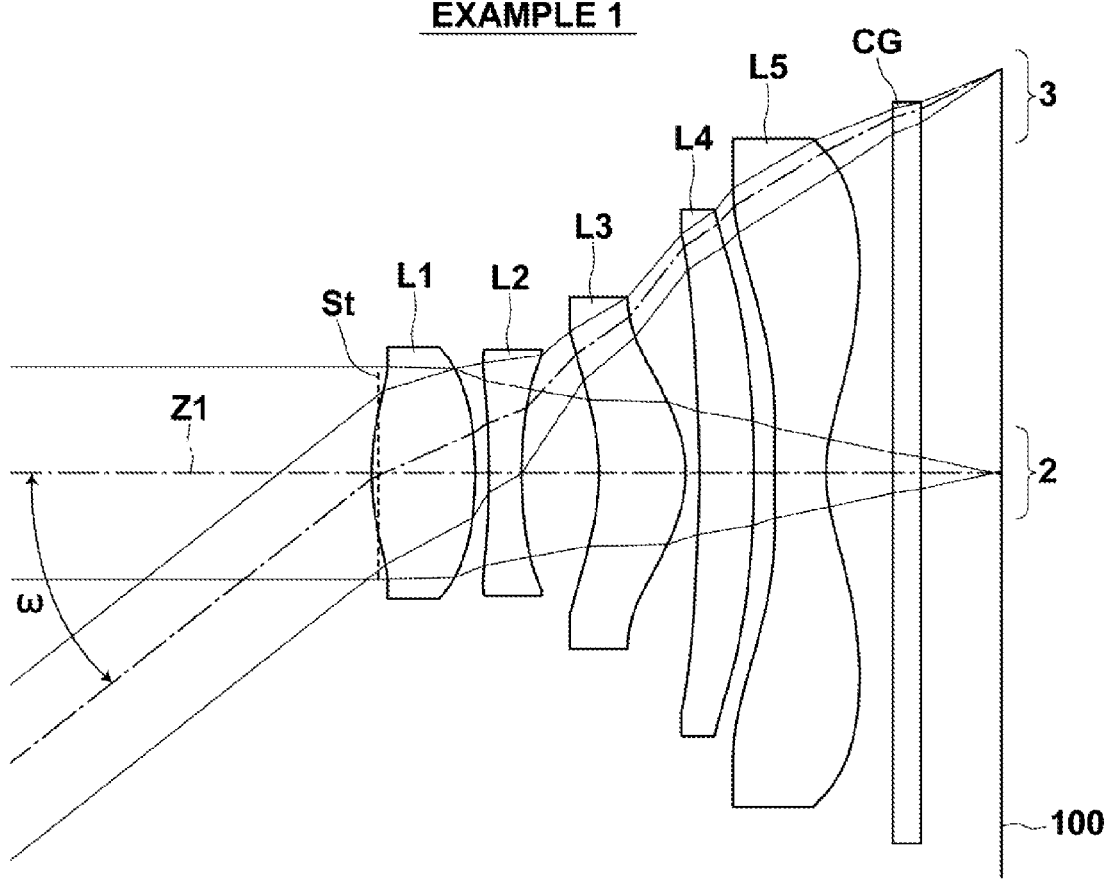
FIG. 8 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 7 are sectional diagrams that illustrate second through seventh examples of lens configurations that correspond to Numerical Examples 2 through 7 (Table 3 through Table 14). In FIGS. 1 through 7, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1 st surface along an optical axis Z1. Note that the basic configurations of the examples are the same, and therefore a description will be given of the imaging lens of FIG. 1 as a base, and the examples of FIGS. 2 through 7 will also be described as necessary. In addition, FIG. 8 is a diagram that illustrates the paths of light rays that pass through the imaging lens L of FIG. 1. FIG. 8 illustrates the paths of an axial light beam 2 and a maximum angle of view light beam 3 from an object at a distance of infinity, and a half value ω of a maximum angle of view.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, in this order from the object side.

Figure 16:
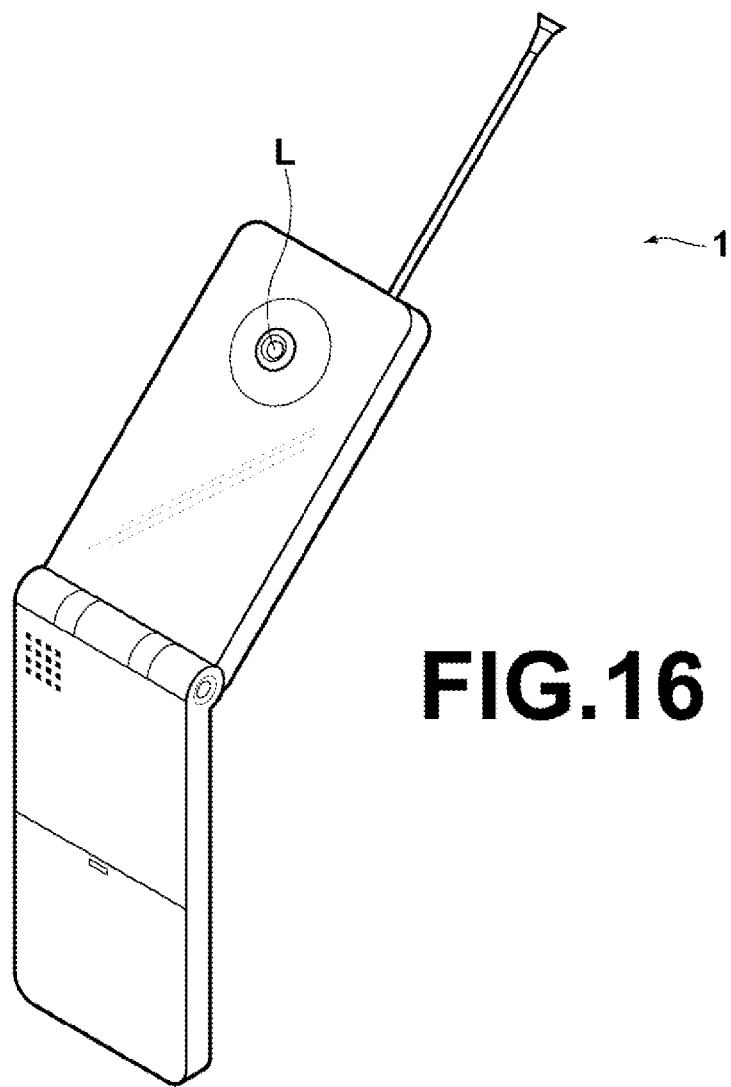
FIG. 16 is a diagram that illustrates a cellular telephone as an imaging apparatus equipped with the imaging lens of the present invention.

FIG. 16 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIGS. 1 through 7) such as a CCD that outputs image signals corresponding to optical images formed by the imaging lens L. The imaging element 100 is provided at an image formation plane of the imaging lens L.

Figure 17:
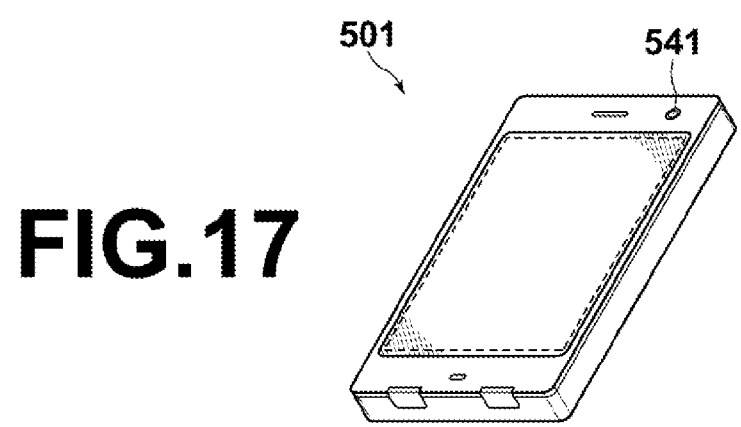
FIG. 17 is a diagram that illustrates a smart phone as an imaging apparatus equipped with the imaging lens of the present invention.

FIG. 17 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIGS. 1 through 7) such as a CCD that outputs image signals corresponding to optical images formed by the imaging lens L. The imaging element 100 is provided at an image formation plane (image surface) of the imaging lens L.

Various optical members CG may be provided between the fifth lens L5 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the fifth lens L5 to obtain the same effect as that of the optical member CG. In this case, the number of parts can be reduced, and the total length can be shortened.

It is preferable for the imaging lens L to be equipped with an aperture stop St positioned at the object side of the surface of the second lens L2 toward the object side. By positioning the aperture stop St at the object side of the surface of the second lens L2 toward the object side, increases in the incident angles of light rays that pass through the optical system and enter the image formation plane (imaging element) can be suppressed, particularly at peripheral angles of view. It is preferable for the apertures stop St to be positioned at the object side of the surface of the first lens L1 toward the object side, in order to cause this advantageous effect to become more prominent. Note that the expression "positioned at the object side of the surface of the second lens L2 toward the object side" means that the position of the aperture stop in the direction of the optical axis is at the same position as the intersection of marginal axial rays of light and the surface of the second lens L2 toward the object side, or more toward the object side than this position. Similarly, the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position.

Further, in the case that the aperture stop St is positioned at the object side of the surface of the first lens L1 toward the object side in the direction of the optical axis, it is preferable for the aperture stop St to be positioned at the image side of the apex of the surface of the first lens L1 toward the object side. In the case that the aperture stop St is positioned at the image side of the apex of the surface of the first lens L1 toward the object side in this manner, the total length of the imaging lens including the aperture stop St can be shortened. Note that in the imaging lenses L of Examples 1, 2, and 5 through 7, which are respectively illustrated in FIGS. 1, 2, and 5 through 7, the aperture stop St is positioned at the object side of the surface of the first lens L1 toward the object side, and positioned at the image side of the apex of the surface of the first lens L1 toward the object side. Alternatively, the aperture stop St may be positioned at the object side of the apex of the surface of the first lens L1 toward the object side, as in the imaging lenses L of Examples 3 and 4, which are respectively illustrated in FIGS. 3 and 4. A case in which the aperture stop St is positioned at the object side of the apex of the surface of the first lens L1 toward the object side is somewhat disadvantageous from the viewpoint of securing peripheral light compared to a case in which the aperture stop St is positioned at the image side of the apex of the surface of the first lens L1 toward the object side. However, increases in the incident angles of light rays at peripheral portions of an imaging region that enter the image formation plane (imaging element) can be more favorably suppressed. Note that the aperture stops St illustrated in FIG. 1 through FIG. 7 do not necessarily represent the sizes or shapes thereof, but indicate the positions thereof on the optical axis Z1.

In the imaging lens L, the first lens L1 has a positive refractive power in the vicinity of the optical axis. This configuration is advantageous from the viewpoint of shortening the total length of the lens. In addition, the first lens L1 has a convex surface toward the object side in the vicinity of the optical axis. Thereby, the positive refractive power of the first lens L1, which performs a substantial portion of the image forming function, can be sufficiently increased. As a result, shortening of the total length of the lens can be more favorably realized. In addition, it is preferable for the first lens L1 to be of a biconvex shape in the vicinity of the optical axis. In this case, spherical aberration can be favorably corrected.

The second lens L2 has a negative refractive power in the vicinity of the optical axis. Thereby, spherical aberration and longitudinal chromatic aberration can be favorably corrected. In addition, the second lens L2 is of a biconcave shape in the vicinity of the optical axis. In this case, chromatic aberration can be favorably corrected, while the generation of higher order spherical aberration can be suppressed.

The third lens L3 has a positive refractive power in the vicinity of the optical axis. Thereby, spherical aberration can be favorably corrected. In addition, the third lens L3 is of a meniscus shape having a concave surface toward the object side in the vicinity of the optical axis. Thereby, astigmatism can be favorably corrected.

It is preferable for the fourth lens L4 to have a negative refractive power in the vicinity of the optical axis. In this case, spherical aberration and lateral chromatic aberration can be favorably corrected. In addition, the fourth lens L4 has a concave surface toward the object side in the vicinity of the optical axis. Thereby, astigmatism can be favorably corrected. In addition, it is preferable for the fourth lens L4 to be of a meniscus shape having a concave surface toward the object side in the vicinity of the optical axis. In this case, astigmatism can be more favorably corrected.

The fifth lens L5 has a negative refractive power in the vicinity of the optical axis. Thereby, if the first lens L1 through the fourth lens L4 are considered to be a single positive lens group, and the fifth lens L5 is considered to be a single negative lens group, the imaging lens L can have a telephoto type configuration as a whole. Thereby, shortening of the total length of the lens can be favorably realized. In addition, field curvature can be favorably corrected by the fifth lens L5 having a negative refractive power in the vicinity of the optical axis. In addition, the fifth lens L5 is of a meniscus shape having a convex surface toward the object side in the vicinity of the optical axis. This configuration is further advantageous from the viewpoint of shortening the total length of the lens.

In addition, it is preferable for the surface of the fifth lens L5 toward the image side to be of an aspherical shape having at least one inflection point. Thereby, increases in the incident angles of light rays that pass through the optical system at and enter the image formation plane (imaging element) can be suppressed, particularly at the peripheral portions of the imaging region. Note that the "inflection point" on the surface of the fifth lens L5 toward the image side refers to a point at which the shape of the surface of the fifth lens L5 toward the image side changes from a convex shape to a concave shape (or from a concave shape to a convex shape) with respect to the image side. In addition, the inflection point may be provided at any arbitrary position in an inwardly radial direction from the intersection of a principal light ray at a maximum angle of view and the surface of the fifth lens L5 toward the image side to the optical axis.

According to the imaging lens L described above, the configurations of each of the first lens L1 through the fifth lens L5 are optimized as lens elements in a lens configuration having a total of five lenses. Therefore, a lens system having a shortened total length and high imaging performance compatible with the increased number of pixels in imaging elements can be realized.

It is preferable for at least one of the surfaces of each of the first lens L1 through the fifth lens L5 of the imaging lens L to be an aspherical surface, in order to improve performance.

In addition, it is preferable for each of the first lens L1 through the fifth lens L5 that constitute the imaging lens L to be a single lens, not a cemented lens. If all of the lenses are single lenses, the number of lens surfaces in contact with air will be greater than a case in which some of the lenses are cemented lenses. Therefore, the degree of freedom in the design of each lens will increase. As a result, shortening of the total length and increase in resolution will be facilitated.

In addition, in the case that the lens configurations of each of the first lens L1 through the fifth lens L5 are set such that the maximum angle of view in a state focused on an object at infinity is 75 degrees or greater as in the imaging lenses of the first through seventh embodiments, a shortening of the total length of the lens can be realized, while the imaging lens L may be favorably applied for use with imaging elements that satisfy demand regarding increased resolution, such as those in cellular telephones.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the focal length f3 of the third lens L3 and the focal length f of the entire system to satisfy Conditional Formula (1) below.

$$0.75 < f/f3 < 1.85 \quad (1)$$

Conditional Formula (1) defines a preferable range of numerical values for the ratio of the focal length f of the entire system with respect to the focal length f3 of the third lens L3. By securing the refractive power of the third lens L3 such that the value of f/f3 is not less than or equal to the lower limit defined in Conditional Formula (1), the positive refractive power of the third lens L3 will not become excessively weak with respect to the refractive power of the entire system. As a result, spherical aberration can be favorably corrected. By suppressing the refractive power of the third lens L3 such that the value of f/f3 is not greater than or equal to the upper limit defined in Conditional Formula (1), the positive refractive power of the third lens L3 will not become excessively strong with respect to the refractive power of the entire system. As a result, shortening of the total length of the lens can be favorably realized while also realizing a wide angle of view. It is more preferable for Conditional Formula (1-1) to be satisfied in order to cause these advantageous effects to become more prominent.

$$0.76 < f/f3 < 1.8 \quad (1-1)$$

In addition, it is preferable for the paraxial radius of curvature L5f of the surface of the fifth lens L5 toward the object side and the paraxial radius of curvature L5r of the surface of the fifth lens L5 toward the image side to satisfy Conditional Formula (2) below.

$$0.5 < (L5f - L5r)/(L5f + L5r) < 0.9 \quad (2)$$

Conditional Formula (2) defines a preferable range of numerical values related to the paraxial radius of curvature L5f of the surface of the fifth lens L5 toward the object side and the paraxial radius of curvature L5r of the surface of the fifth lens L5 toward the image side. By configuring the imaging lens such that the value of (L5f−L5r)/(L5f+L5r) is not less than or equal to the lower limit defined in Conditional Formula (2), securing the negative refractive power of the fifth lens L5 is facilitated. Such a configuration is advantageous from the viewpoint of configuring the imaging lens L as a telephoto type lens equipped with a positive lens group constituted by the first lens L1 through the fourth lens L4 and a negative lens group constituted by the fifth lens L5 in order to shorten the total length of the lens. By configuring the imaging lens such that the value of (L5f−L5r)/(L5f+L5r) is not greater than or equal to the upper limit defined in Conditional Formula (2), astigmatism and distortion at intermediate angles of view can be favorably corrected, while increases in the incident angles of light rays that pass through the optical system at intermediate angles of view and enter the image formation plane (imaging element) can be suppressed. It is more preferable for Conditional Formula (2-1) to be satisfied, and even more preferable for Conditional Formula (2-2) to be satisfied, in order to cause these advantageous effects to become more prominent.

$$0.52 < (L5f - L5r)/(L5f + L5r) < 0.87 \quad (2-1)$$

$$0.54 < (L5f - L5r)/(L5f + L5r) < 0.85 \quad (2-2)$$

In addition, it is preferable for the paraxial radius of curvature L1f of the surface of the first lens L1 toward the object side and the paraxial radius of curvature L1r of the surface of the first lens L1 toward the image side to satisfy Conditional Formula (3) below.

$$-0.33 < (L1f + L1r)/(L1f - L1r) < -0.17 \quad (3)$$

Conditional Formula (3) defines a preferable range of numerical values related to the paraxial radius of curvature L1f of the surface of the first lens L1 toward the object side and the paraxial radius of curvature L1r of the surface of the first lens L1 toward the image side. By configuring the imaging lens such that the value of (L1f+L1r)/(L1f−L1r) is not less than or equal to the lower limit defined in Conditional Formula (3), securing the positive refractive power of the first lens L1 is facilitated. By configuring the imaging lens such that the value of (L1f+L1r)/(L1f−L1r) is not greater than or equal to the upper limit defined in Conditional Formula (3), the generation of spherical aberration can be suppressed, and spherical aberration can be favorably corrected. It is preferable for Conditional Formula (3-1) to be satisfied, in order to cause these advantageous effects to become more prominent.

$$-0.31 < (L1f+L1r)/(L1f-L1r) < -0.18 \quad (3\text{-}1)$$

In addition, it is preferable for the focal length f of the entire system and the refractive power P45 of an air lens formed between the surface of the fourth lens L4 toward the image side and the surface of the fifth lens L5 toward the object side to satisfy Conditional Formula (4) below.

$$0 < f \cdot P45 < 0.55 \quad (4)$$

Here, P45 is obtained by Formula (P) below:

$$P45 = \frac{1-Nd4}{L4r} + \frac{Nd5-1}{L5f} - \frac{(1-Nd4) \times (Nd5-1) \times D9}{L4r \times L5f} \quad (P)$$

wherein Nd 4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

Refractive power is an inverse of focal length. Therefore, if the focal length of the air lens formed between the surface of the fourth lens L4 toward the image side and the surface of the fifth lens L5 toward the object side is designated as f45a, Conditional Formula (4) defines a preferable range of numerical values for the ratio of the focal length f of the entire system with respect to the focal length f45a. By configuring the imaging lens such that the value of f·P45 is not less than or equal to the lower limit defined in Conditional Formula (4), the positive refractive power of the air lens formed between the surface of the fourth lens L4 toward the image side and the surface of the fifth lens L5 toward the object side will not be excessively weak. As a result, distortion can be favorably corrected at intermediate angles of view, while increases in the incident angles of light rays that pass through the optical system at intermediate angles of view and enter the image formation plane (imaging element) can be suppressed. By configuring the imaging lens such that the value of f·P45 is not greater than or equal to the upper limit defined in Conditional Formula (4), the positive refractive power of the air lens formed between the surface of the fourth lens L4 toward the image side and the surface of the fifth lens L5 toward the object side will not be excessively strong. As a result, the generation of spherical aberration can be suppressed. It is more preferable for Conditional Formula (4-1) to be satisfied, and even more preferable for Conditional Formula (4-2) to be satisfied, in order to cause these advantageous effects to become more prominent.

$$0.2 < f \cdot P45 < 0.51 \quad (4\text{-}1)$$

$$0.3 < f \cdot P45 < 0.49 \quad (4\text{-}2)$$

In addition, it is preferable for the focal distance f of the entire system, the half angle of view ω when in a state of focus on an object at infinity, and the paraxial radius of curvature L5r of the surface of the fifth lens L5 toward the image side to satisfy Conditional Formula (5) below.

$$0.5 < f \cdot \tan \omega / L5r < 20 \quad (5)$$

Conditional Formula (5) defines a preferable range of numerical values for the ratio of a paraxial image height (f·tan ω) with respect to the paraxial radius of curvature L5r of the surface of the fifth lens L5 toward the image side. By configuring the imaging lens such that the value of f·tan ω/L5r is not less than or equal to the lower limit defined in Conditional Formula (5), the absolute value of the paraxial radius of curvature L5r of the surface of the fifth lens L5 toward the image side, which is the surface most toward the image side in the imaging lens L, will not be excessively large with respect to the paraxial image height (f·tan ω). Thereby, field curvature can be sufficiently corrected while realizing a shortening of the total length. Note that field curvature can be favorably corrected from a central angle of view to peripheral angles of view in the case that in the case that the fifth lens L5 is of an aspherical shape having a concave surface toward the image side and at least one inflection point as illustrated in the imaging lenses L of each of the Examples, and in the case that the lower limit of Conditional Formula (5) is satisfied. Therefore, this configuration facilitates realization of a wide angle of view. In addition, by configuring the imaging lens such that the value of f·tan ω/L5r is not greater than or equal to the upper limit defined in Conditional Formula (5), the absolute value of the paraxial radius of curvature L5r of the surface of the fifth lens L5 toward the image side, which is the surface most toward the image side in the imaging lens, will not be excessively small with respect to the paraxial image height (f·tan ω). Thereby, increases in the incident angle of light rays that pass through the optical system and enter the image formation plane (imaging element) can be suppressed at intermediate angles of view. It is preferable for Conditional Formula (5-1) to be satisfied, and more preferable for Conditional Formula (5-2) to be satisfied, in order to cause these advantageous effects to become more prominent.

$$0.7 < f \cdot \tan \omega / L5r < 10 \quad (5\text{-}1)$$

$$1 < f \cdot \tan \omega / L5r < 5 \quad (5\text{-}2)$$

Further improved imaging performance can be realized by satisfying the above preferred conditions appropriately. In addition, the imaging apparatuses according to the embodiments of the present invention output image signals corresponding to optical images formed by the high performance imaging lenses according to the embodiments of the present invention. Therefore, images having high resolution and wide angles of view can be obtained, while achieving a shortening of the apparatus size.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column vdj.

Table 1 also shows the aperture stop St and the optical member CG. The signs of the radii of curvature are positive for surface shapes having convex surfaces toward the object side, and negative for surface shapes having convex surfaces toward the image side. Note that the values of the focal length f (mm) of the entire system, the back focus Bf (mm), the F number Fno. and the maximum angle of view 2ω(°) in a state focused on an object at infinity are shown as data above the lens data. Note that the back focus Bf is represented as an air converted value.

A "*" mark is appended to the surface numbers of aspherical surfaces in the basic lens data of Table 1. In the imaging lens of Example 1, both of the surfaces of the first lens L1 through the fifth lens L5 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10$^{-2}$".

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - KA \times C^2 \times h^2}} + \sum_n An \times h^n \quad (A)$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 7 are shown in Table 3 through Table 14 as Example 2 through Example 7. In the imaging lenses of Examples 1 through 7, both of the surfaces of the first lens L1 through the fifth lens L5 are all aspherical surfaces.

Figure 9:
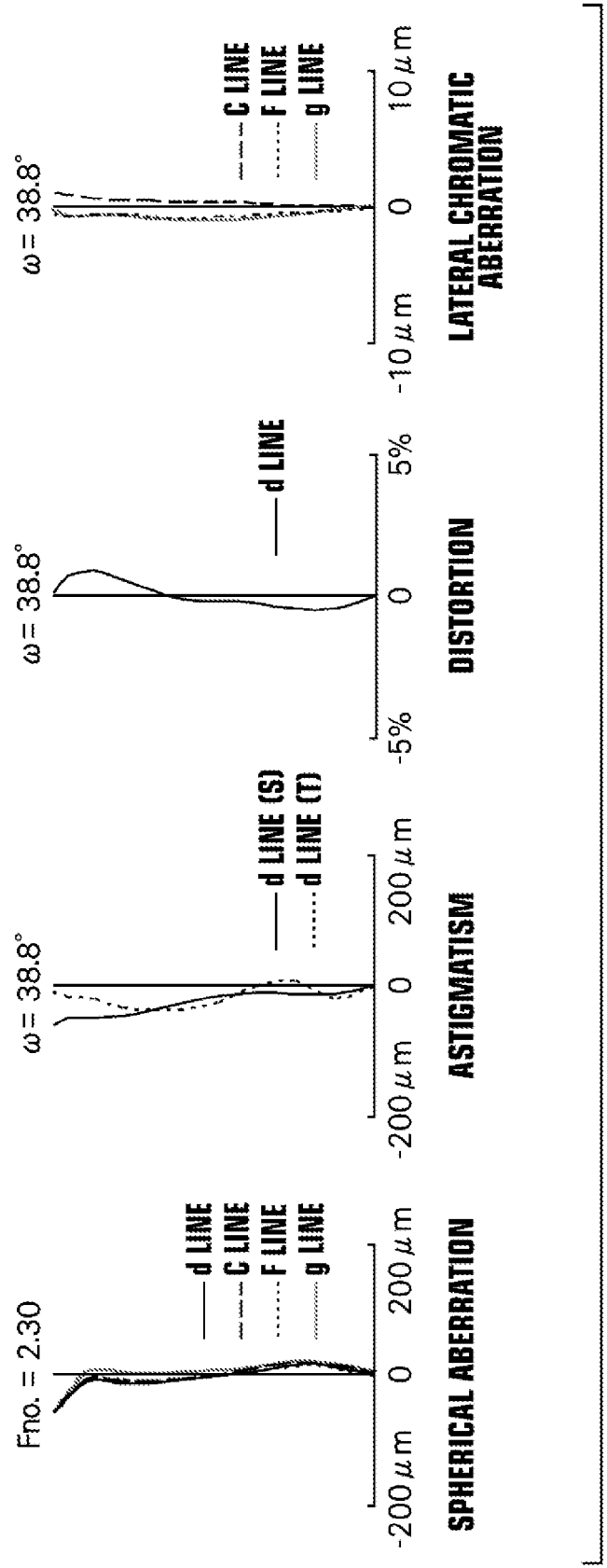
FIG. 9 is a collection of diagrams that illustrate aberrations of the imaging lens of Example 1, wherein the diagrams illustrate spherical aberration, astigmatic aberration, distortion, and lateral chromatic aberration, in this order from the left side of the drawing sheet.
Figure 10:
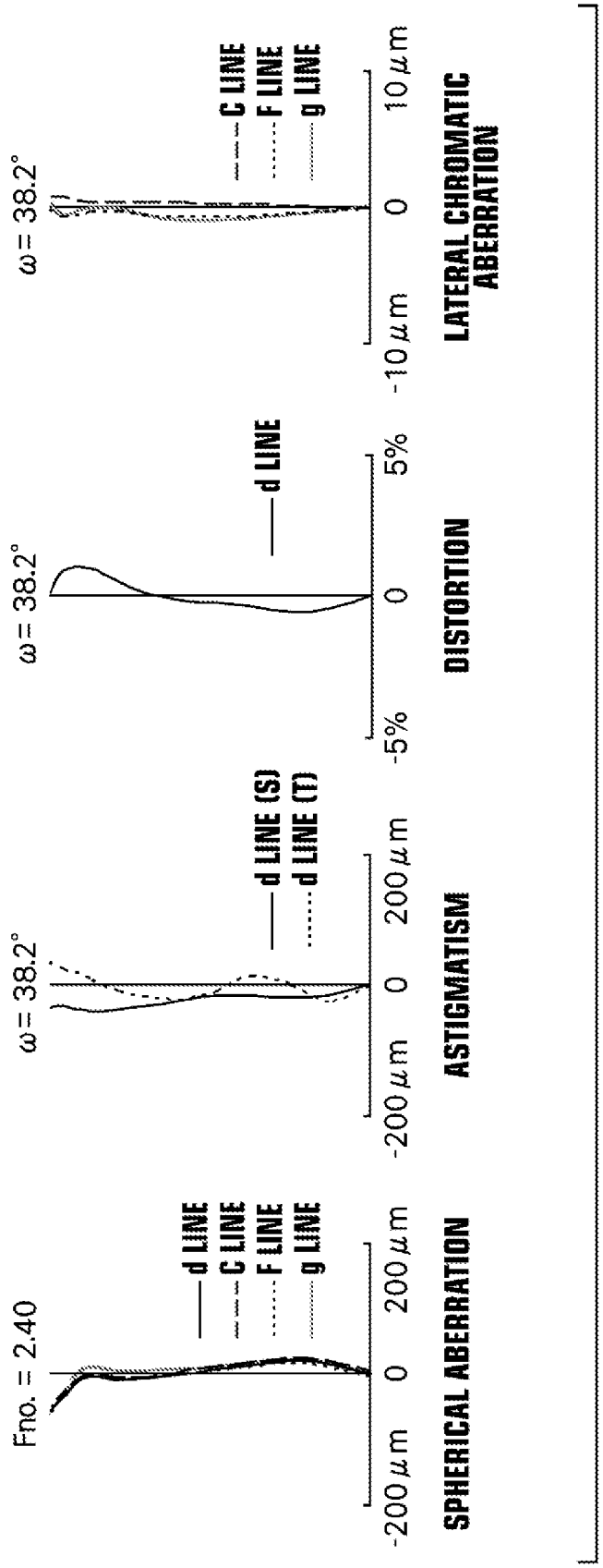
FIG. 10 is a collection of diagrams that illustrate aberrations of the imaging lens of Example 2, wherein the diagrams illustrate spherical aberration, astigmatic aberration, distortion, and lateral chromatic aberration, in this order from the left side of the drawing sheet.
Figure 11:
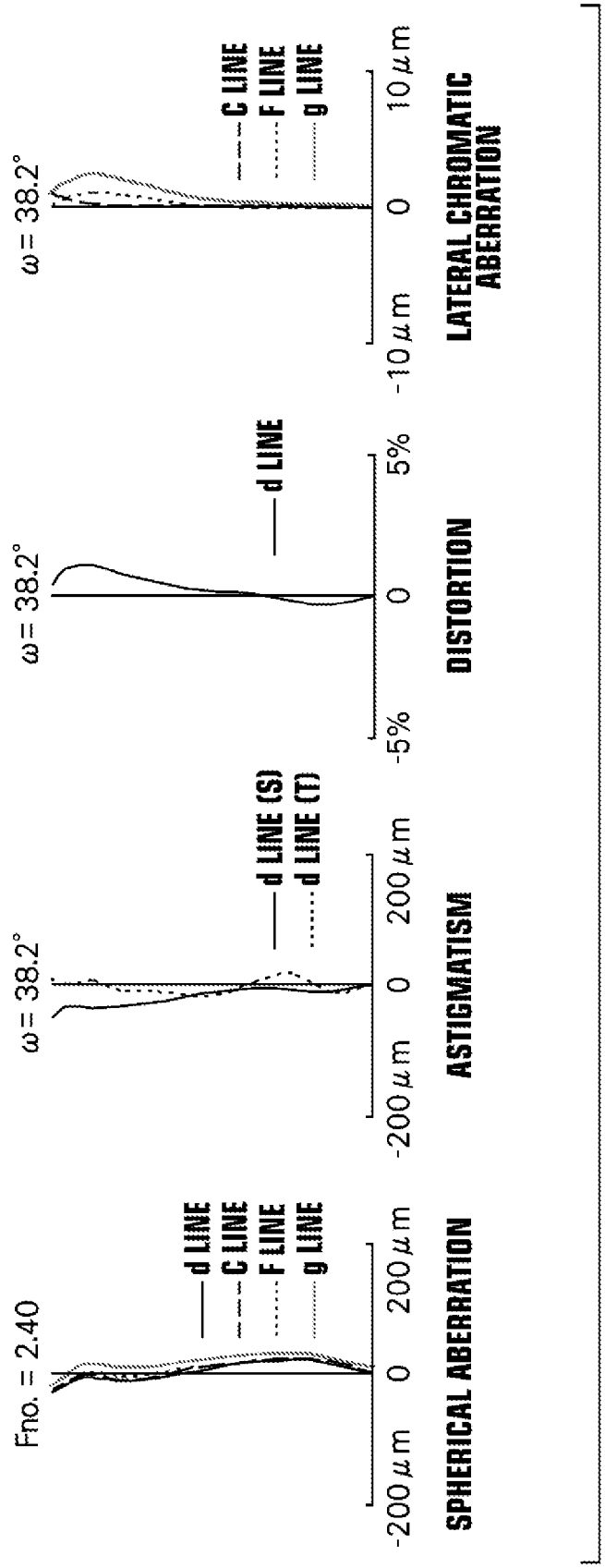
FIG. 11 is a collection of diagrams that illustrate aberrations of the imaging lens of Example 3, wherein the diagrams illustrate spherical aberration, astigmatic aberration, distortion, and lateral chromatic aberration, in this order from the left side of the drawing sheet.
Figure 12:
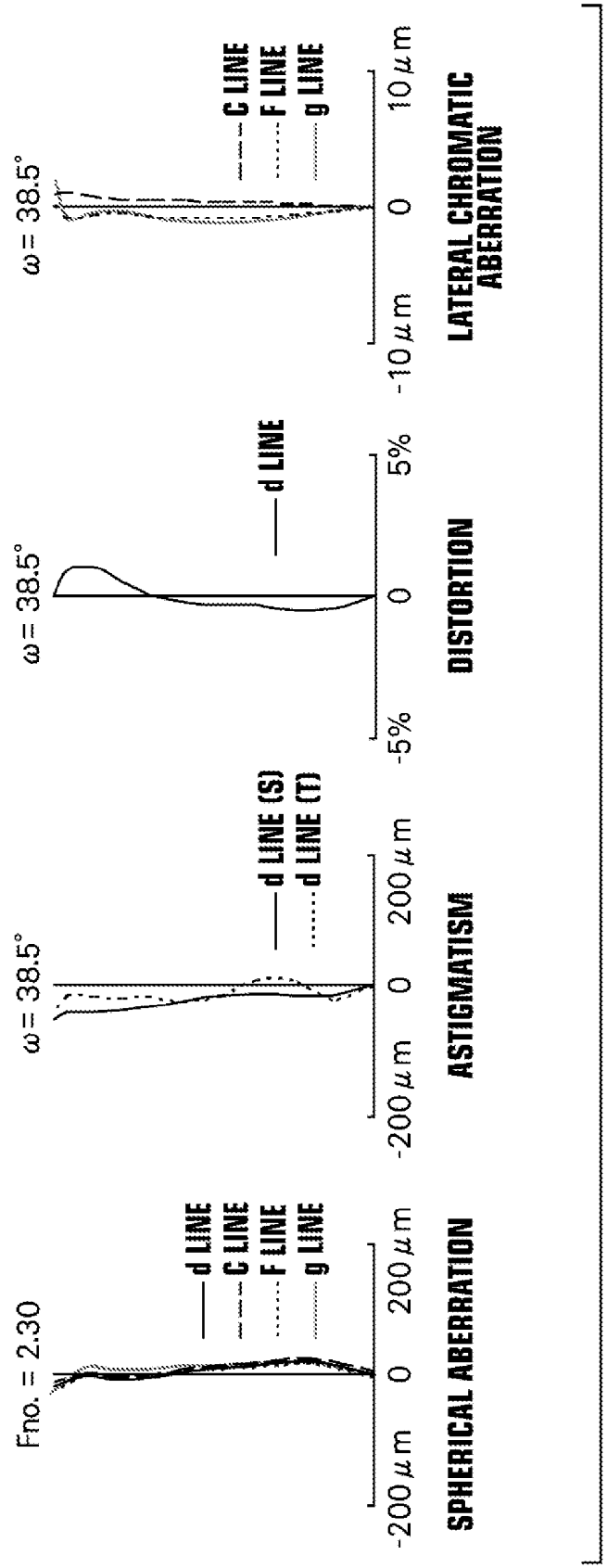
FIG. 12 is a collection of diagrams that illustrate aberrations of the imaging lens of Example 4, wherein the diagrams illustrate spherical aberration, astigmatic aberration, distortion, and lateral chromatic aberration, in this order from the left side of the drawing sheet.
Figure 13:
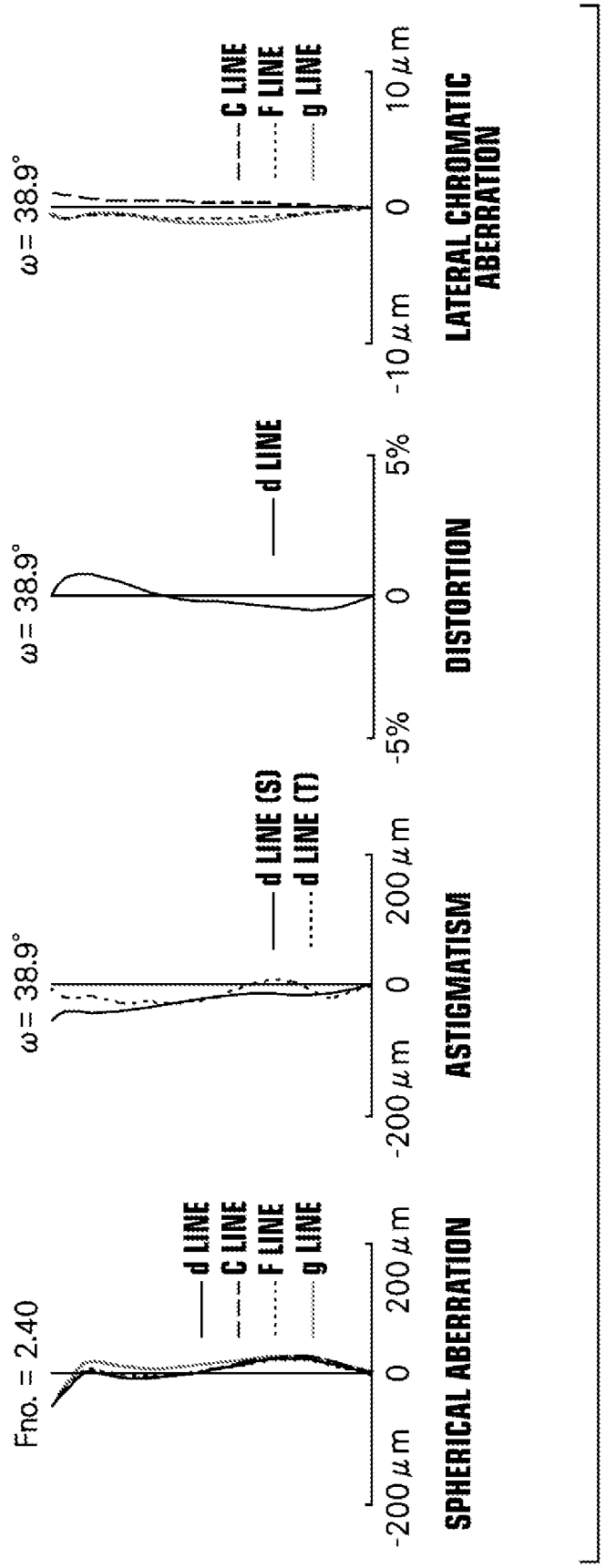
FIG. 13 is a collection of diagrams that illustrate aberrations of the imaging lens of Example 5, wherein the diagrams illustrate spherical aberration, astigmatic aberration, distortion, and lateral chromatic aberration, in this order from the left side of the drawing sheet.
Figure 14:
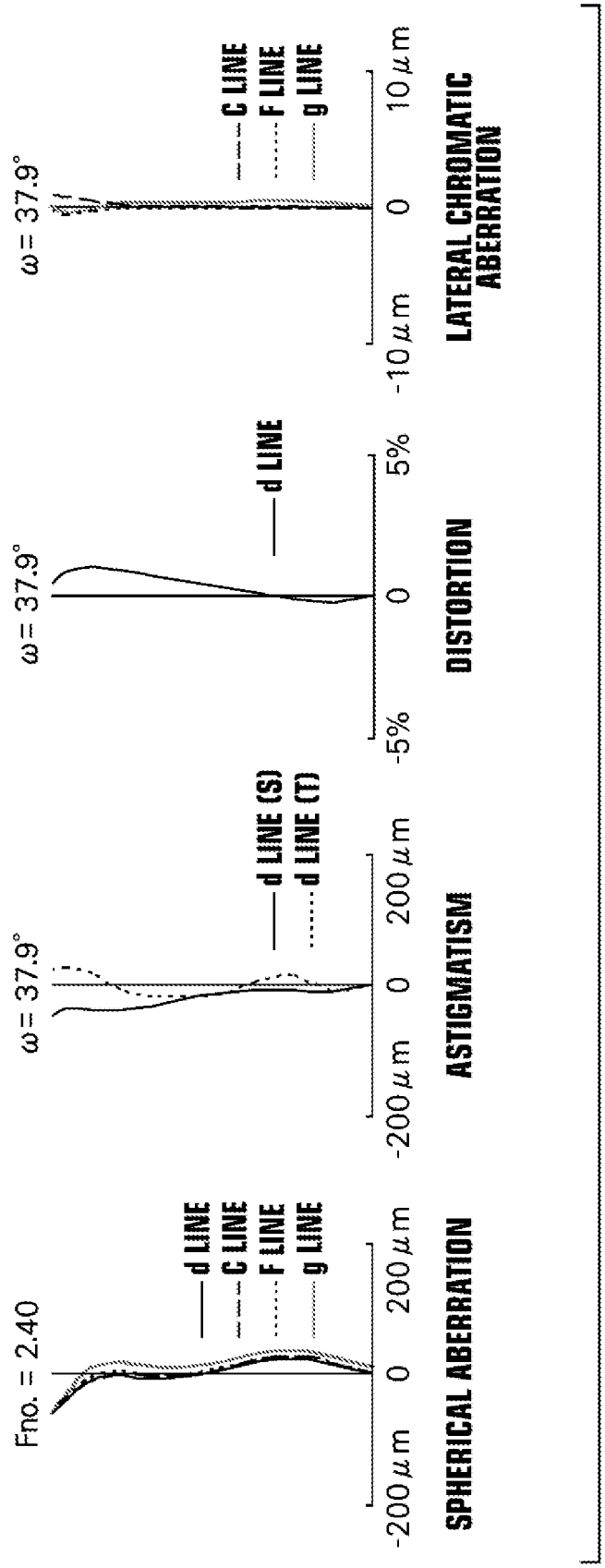
FIG. 14 is a collection of diagrams that illustrate aberrations of the imaging lens of Example 6, wherein the diagrams illustrate spherical aberration, astigmatic aberration, distortion, and lateral chromatic aberration, in this order from the left side of the drawing sheet.
Figure 15:
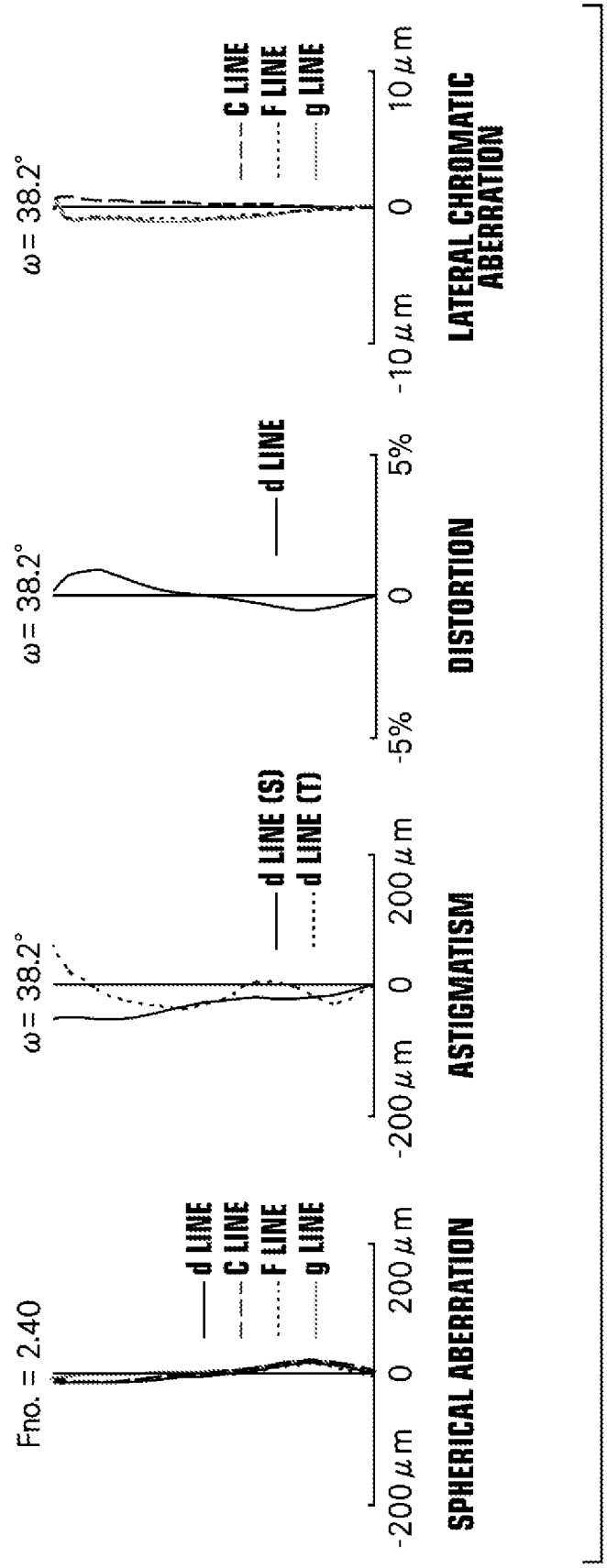
FIG. 15 is a collection of diagrams that illustrate aberrations of the imaging lens of Example 7, wherein the diagrams illustrate spherical aberration, astigmatic aberration, distortion, and lateral chromatic aberration, in this order from the left side of the drawing sheet.

FIG. 9 is a collection of diagrams that illustrate aberrations of the imaging lens of Example 1, wherein the diagrams illustrate the spherical aberration, the astigmatic aberration, the distortion, and the lateral chromatic aberration (chromatic aberration of magnification) of the imaging lens of Example 1, respectively, in this order from the left side of the drawing sheet. Each of the diagrams that illustrate the spherical aberration, the astigmatic aberration (field curvature), and the distortion illustrate aberrations using the d line (wavelength: 587.6 nm) as a reference wavelength. The diagram that illustrates spherical aberration also shows aberrations related to the F line (wavelength: 486.1 nm), the C line (wavelength: 656.3 nm) and the g line (wavelength: 435.83 nm). The diagram that illustrates lateral chromatic aberration shows aberrations related to the F line, the C line, and the g line. In the diagram that illustrates astigmatic aberration, aberration in the sagittal direction (S) is indicated by a solid line, while aberration in the tangential direction (T) is indicated by a broken line. In addition, "Fno." denotes F numbers, and "ω" denotes a half value of the maximum angle of view in a state focused on an object at infinity.

Similarly, the aberrations of the imaging lens of Example 2 through Example 7 are illustrated in FIG. 10 through FIG. 15. The diagrams that illustrate aberrations of FIG. 10 through FIG. 15 are all for a case in which the object distance is infinity.

Table 15 shows values corresponding to Conditional Formulae (1) through (5), respectively summarized for each of Examples 1 through 7.

Note that each of the tables show numerical values which are rounded off at a predetermined number of digits. "°" are employed as units for the numerical values indicating angles and "mm" are employed as units for the numerical values indicating lengths. However, these units are merely examples. Other appropriate units may be employed, because it is possible to utilize optical systems which are proportionately enlarged or proportionately reduced in size.

As can be understood from each set of numerical value data and from the diagrams that illustrate aberrations, the imaging lenses of Examples 1 through 7 have widened maximum angles of view of 70° or greater in a state focused on an object at infinity, shortened total lengths, favorably correct various aberrations, and realize high imaging performance from a central angle of view to peripheral angles of view.

The present invention has been described using the embodiments and the Examples. However, the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 3.822, Bf = 1.242, Fno. = 2.30, 2ω = 77.6

| Si | Ri | Di | Ndj | vdj |
|---|---|---|---|---|
| 1 (aperture stop) | ∞ | −0.051 | | |
| *2 | 2.07496 | 0.772 | 1.54488 | 54.87 |
| *3 | −3.12768 | 0.100 | | |
| *4 | −9.10366 | 0.250 | 1.63351 | 23.63 |
| *5 | 3.95091 | 0.577 | | |
| *6 | −1.97890 | 0.650 | 1.54488 | 54.87 |
| *7 | −0.95344 | 0.100 | | |
| *8 | −6.61197 | 0.409 | 1.63351 | 23.63 |
| *9 | −8.42063 | 0.151 | | |
| *10 | 11.64427 | 0.385 | 1.54488 | 54.87 |
| *11 | 1.19711 | 0.500 | | |
| 12 | ∞ | 0.210 | 1.51680 | 64.20 |
| 13 | ∞ | 0.603 | | |
| 14 (imaging plane) | ∞ | | | |

*aspherical surface

TABLE 2

Example 1: Aspherical Surface Data

| Surface Number | KA | A3 | A4 | A5 | A6 |
|---|---|---|---|---|---|
| 2 | −8.8570285E+00 | 0.0000000E+00 | −1.8912158E−02 | 7.9486439E−01 | −2.5741514E+00 |
| 3 | 7.8424420E+00 | 0.0000000E+00 | −4.6913850E−02 | 2.1333975E−01 | −1.4924172E+00 |
| 4 | 2.0000009E+01 | 0.0000000E+00 | 6.7432025E−02 | 2.5795604E−02 | −1.1289536E+00 |
| 5 | −2.0000009E+01 | 0.0000000E+00 | 2.1209207E−01 | −3.2760311E−01 | 4.7266878E−01 |
| 6 | −1.9384981E+00 | 0.0000000E+00 | −3.3975307E−02 | 7.0409153E−03 | 2.3984159E−01 |
| 7 | −2.8291138E+00 | 0.0000000E+00 | −2.0486853E−01 | 2.0677879E−01 | 4.5116248E−02 |
| 8 | −1.9997759E+01 | 0.0000000E+00 | 1.7027360E−01 | −3.4600387E−01 | 4.3761298E−01 |
| 9 | 9.6128898E+00 | 0.0000000E+00 | 2.4398183E−02 | −1.7480496E−01 | 3.5953319E−01 |
| 10 | 1.7676169E+01 | 0.0000000E+00 | −1.7291785E−01 | −1.0878821E−01 | 3.9805247E−01 |
| 11 | −4.2181001E+00 | 0.0000000E+00 | −2.3965057E−01 | 2.5368034E−01 | −1.2148981E−01 |

| | A7 | A8 | A9 |
|---|---|---|---|
| 2 | 3.7518265E+00 | −2.7810905E+00 | 7.3051828E−01 |
| 3 | 2.9075031E+00 | −2.3974118E+00 | 7.3165480E−01 |
| 4 | 2.0733625E+00 | −1.2803948E+00 | 2.8126588E−01 |
| 5 | −6.8444381E−01 | 6.3393177E−01 | −1.8915200E−01 |
| 6 | −3.0937989E−01 | 1.6929655E−01 | −4.1262852E−02 |
| 7 | −2.4029155E−01 | 2.7222316E−01 | −9.8176677E−02 |
| 8 | −3.6166776E−01 | 1.5895498E−01 | −2.7459149E−02 |
| 9 | −3.2219248E−01 | 1.3114946E−01 | −1.9825331E−02 |
| 10 | −3.0786152E−01 | 1.0296157E−01 | −1.3046393E−02 |
| 11 | 2.9013832E−02 | −2.7834228E−03 | −5.8717234E−05 |

TABLE 3

Example 2
f = 3.910, Bf = 1.178, Fno. = 2.40, 2ω = 76.4

| Si | Ri | Di | Ndj | νdj |
|---|---|---|---|---|
| 1 (aperture stop) | ∞ | −0.093 | | |
| *2 | 1.96884 | 0.797 | 1.54488 | 54.87 |
| *3 | −2.96396 | 0.100 | | |
| *4 | −7.11245 | 0.277 | 1.63351 | 23.63 |
| *5 | 4.27421 | 0.485 | | |
| *6 | −1.47205 | 0.484 | 1.54488 | 54.87 |
| *7 | −1.05921 | 0.120 | | |
| *8 | −31.88305 | 0.451 | 1.63351 | 23.63 |
| *9 | −34.40265 | 0.189 | | |
| *10 | 8.19298 | 0.550 | 1.54488 | 54.87 |
| *11 | 1.50599 | 0.500 | | |
| 12 | ∞ | 0.210 | 1.51680 | 64.20 |
| 13 | ∞ | 0.540 | | |
| 14 (imaging plane) | ∞ | | | |

*aspherical surface

TABLE 4

Example 2: Aspherical Surface Data

| Surface Number | KA | A3 | A4 | A5 | A6 |
|---|---|---|---|---|---|
| 2 | −8.6712958E+00 | 0.0000000E+00 | −3.7513323E−03 | 8.4844111E−01 | −2.8125622E+00 |
| 3 | 7.7157007E+00 | 0.0000000E+00 | −4.0587886E−02 | 3.2706332E−01 | −2.1846583E+00 |
| 4 | −2.0000010E+01 | 0.0000000E+00 | 7.0019256E−02 | 6.4900708E−02 | −1.3375906E+00 |
| 5 | −1.9293003E+01 | 0.0000000E+00 | 2.3115359E−01 | −3.4128346E−01 | 5.2834327E−01 |
| 6 | −1.6441030E+00 | 0.0000000E+00 | −4.8758240E−02 | 3.0206569E−02 | 4.2102326E−01 |

TABLE 4-continued

Example 2: Aspherical Surface Data

| | | | | | |
|---|---|---|---|---|---|
| 7 | −3.5123557E+00 | 0.0000000E+00 | −2.8374065E−01 | 3.0172653E−01 | 1.0445162E−01 |
| 8 | 1.1403136E+01 | 0.0000000E+00 | 1.7370397E−01 | −3.6937147E−01 | 4.7458518E−01 |
| 9 | 2.0000009E+01 | 0.0000000E+00 | 1.9935414E−02 | −1.7921755E−01 | 3.7382926E−01 |
| 10 | 8.4270530E+00 | 0.0000000E+00 | −1.8360411E−01 | −1.1654024E−01 | 4.3062275E−01 |
| 11 | −4.8541044E+00 | 0.0000000E+00 | −2.1255394E−01 | 2.1448050E−01 | −9.9967184E−02 |

| | A7 | A8 | A9 |
|---|---|---|---|
| 2 | 4.1148239E+00 | −3.0121711E+00 | 7.6012449E−01 |
| 3 | 4.3950719E+00 | −3.8078730E+00 | 1.2360043E+00 |
| 4 | 2.4423895E+00 | −1.5751326E+00 | 3.7475556E−01 |
| 5 | −8.2664853E−01 | 7.7265265E−01 | −2.2296340E−01 |
| 6 | −5.9274490E−01 | 3.3415534E−01 | −8.4865710E−02 |
| 7 | −3.7234085E−01 | 4.1661536E−01 | −1.6770483E−01 |
| 8 | −3.9540754E−01 | 1.7608646E−01 | −3.1048937E−02 |
| 9 | −3.3708811E−01 | 1.3783948E−01 | −2.1003455E−02 |
| 10 | −3.3618841E−01 | 1.1375091E−01 | −1.4640247E−02 |
| 11 | 2.3749326E−02 | −2.2650669E−03 | −5.9523760E−05 |

TABLE 5

Example 3
$f = 3.905$, $Bf = 1.412$, $Fno. = 2.40$, $2\omega = 76.4$

| Si | Ri | Di | Ndj | νdj |
|---|---|---|---|---|
| 1 (aperture stop) | ∞ | 0.104 | | |
| *2 | 2.08842 | 0.757 | 1.54488 | 54.87 |
| *3 | −3.14469 | 0.111 | | |
| *4 | −8.74042 | 0.259 | 1.63351 | 23.63 |
| *5 | 3.73938 | 0.587 | | |
| *6 | −2.10606 | 0.650 | 1.54488 | 54.87 |
| *7 | −0.87345 | 0.100 | | |
| *8 | −5.85937 | 0.365 | 1.63351 | 23.63 |
| *9 | −8.78527 | 0.137 | | |
| *10 | 12.25150 | 0.250 | 1.54488 | 54.87 |
| *11 | 1.11170 | 0.500 | | |
| 12 | ∞ | 0.210 | 1.51680 | 64.20 |
| 13 | ∞ | 0.773 | | |
| 14 (imaging plane) | ∞ | | | |

*aspherical surface

TABLE 6

Example 3: Aspherical Surface Data

| Surface Number | KA | A3 | A4 | A5 | A6 |
|---|---|---|---|---|---|
| 2 | −8.9507760E+00 | 0.0000000E+00 | −2.8819146E−02 | 8.3362242E−01 | −2.7256185E+00 |
| 3 | 7.9329736E+00 | 0.0000000E+00 | −5.0164136E−02 | 2.3163329E−01 | −1.6348672E+00 |
| 4 | 1.6827837E+01 | 0.0000000E+00 | 4.3524140E−02 | 3.9015697E−02 | −1.1083510E+00 |
| 5 | −1.8901273E+01 | 0.0000000E+00 | 1.9164845E−01 | −3.0916803E−01 | 4.6858552E−01 |
| 6 | −1.9850337E+00 | 0.0000000E+00 | −3.1477853E−02 | 5.1375931E−03 | 2.5470982E−01 |
| 7 | −2.7786889E+00 | 0.0000000E+00 | −2.0977374E−01 | 2.2163570E−01 | 4.9172891E−02 |

TABLE 6-continued

Example 3: Aspherical Surface Data

| | | | | | |
|---|---|---|---|---|---|
| 8 | −1.9093059E+01 | 0.0000000E+00 | 1.6359632E−01 | −3.3225831E−01 | 4.0962519E−01 |
| 9 | 1.2442798E−01 | 0.0000000E+00 | 1.7651285E−02 | −1.7043629E−01 | 3.4368553E−01 |
| 10 | 6.4727627E+00 | 0.0000000E+00 | −1.7162010E−01 | −1.0227498E−01 | 3.6571766E−01 |
| 11 | −4.3760231E+00 | 0.0000000E+00 | −2.9228085E−01 | 3.2990842E−01 | −1.7295811E−01 |

| | A7 | A8 | A9 |
|---|---|---|---|
| 2 | 4.0389177E+00 | −3.0262431E+00 | 7.9789980E−01 |
| 3 | 3.2454399E+00 | −2.7247938E+00 | 8.4375741E−01 |
| 4 | 2.0977634E+00 | −1.3246539E+00 | 2.8967205E−01 |
| 5 | −6.4277752E−01 | 5.8292161E−01 | −1.7693560E−01 |
| 6 | −3.3271463E−01 | 1.8629580E−01 | −4.6412029E−02 |
| 7 | −2.5695564E−01 | 2.8563651E−01 | −1.0249762E−01 |
| 8 | −3.3295370E−01 | 1.4538486E−01 | −2.4992116E−02 |
| 9 | −3.0381806E−01 | 1.2290240E−01 | −1.8469478E−02 |
| 10 | −2.7604267E−01 | 9.1485325E−02 | −1.1636003E−02 |
| 11 | 4.6235670E−02 | −5.1320064E−03 | −5.5159155E−05 |

TABLE 7

Example 4
f = 3.877, Bf = 1.178, Fno. = 2.30, 2ω = 77.0

| Si | Ri | Di | Ndj | νdj |
|---|---|---|---|---|
| 1 (aperture stop) | ∞ | 0.035 | | |
| *2 | 1.95703 | 0.800 | 1.54488 | 54.87 |
| *3 | −2.98554 | 0.100 | | |
| *4 | −6.86179 | 0.267 | 1.63351 | 23.63 |
| *5 | 4.42084 | 0.491 | | |
| *6 | −1.46851 | 0.495 | 1.54488 | 54.87 |
| *7 | −1.04600 | 0.104 | | |
| *8 | −38.65402 | 0.470 | 1.63351 | 23.63 |
| *9 | −39.24884 | 0.176 | | |
| *10 | 8.61549 | 0.539 | 1.54488 | 54.87 |
| *11 | 1.49493 | 0.500 | | |
| 12 | ∞ | 0.210 | 1.51680 | 64.20 |
| 13 | ∞ | 0.540 | | |
| 14 (imaging plane) | ∞ | | | |

*aspherical surface

TABLE 8

Example 4: Aspherical Surface Data

| Surface Number | KA | A3 | A4 | A5 | A6 |
|---|---|---|---|---|---|
| 2 | −8.5628238E+00 | 0.0000000E+00 | 6.5809506E−05 | 8.3741444E−01 | −2.7861050E+00 |
| 3 | 7.7245180E+00 | 0.0000000E+00 | −3.6925249E−02 | 3.1350828E−01 | −2.1349955E+00 |
| 4 | −1.3232516E+01 | 0.0000000E+00 | 7.4553694E−02 | 6.4734239E−02 | −1.4314578E+00 |
| 5 | −2.0000010E+01 | 0.0000000E+00 | 2.2013896E−01 | −3.4522705E−01 | 5.4780515E−01 |
| 6 | −1.6547821E+00 | 0.0000000E+00 | −4.3510369E−02 | 1.3459434E−02 | 4.3218524E−01 |
| 7 | −3.5321781E+00 | 0.0000000E+00 | −2.7455675E−01 | 3.0179380E−01 | 9.7120252E−02 |
| 8 | 6.4312507E+00 | 0.0000000E+00 | 1.7181383E−01 | −3.7181693E−01 | 4.7744717E−01 |

TABLE 8-continued

Example 4: Aspherical Surface Data

| | | | | | |
|---|---|---|---|---|---|
| 9 | 1.1876560E+01 | 0.0000000E+00 | 1.6370683E-02 | -1.7251575E-01 | 3.5640187E-01 |
| 10 | 8.4383103E+00 | 0.0000000E+00 | -1.5895486E-01 | -9.8514950E-02 | 3.5270913E-01 |
| 11 | -4.5801761E+00 | 0.0000000E+00 | -2.0711001E-01 | 2.0908342E-01 | -9.7984744E-02 |

| | A7 | A8 | A9 |
|---|---|---|---|
| 2 | 4.0739611E+00 | -2.9639653E+00 | 7.3680896E-01 |
| 3 | 4.2438681E+00 | -3.6361367E+00 | 1.1782521E+00 |
| 4 | 2.6487505E+00 | -1.7294823E+00 | 4.1662066E-01 |
| 5 | -8.3625802E-01 | 7.8516831E-01 | -2.3116403E-01 |
| 6 | -6.0559181E-01 | 3.6011428E-01 | -9.8393621E-02 |
| 7 | -3.6858206E-01 | 4.1360757E-01 | -1.6556455E-01 |
| 8 | -3.9630720E-01 | 1.7673015E-01 | -3.1306840E-02 |
| 9 | -3.1775946E-01 | 1.2882921E-01 | -1.9495706E-02 |
| 10 | -2.6657744E-01 | 8.7252496E-02 | -1.0863630E-02 |
| 11 | 2.3479960E-02 | -2.2144155E-03 | -7.5807955E-05 |

TABLE 9

Example 5
f = 3.815, Bf = 1.252, Fno. = 2.40, 2ω = 77.8

| Si | Ri | Di | Ndj | νdj |
|---|---|---|---|---|
| 1 (aperture stop) | ∞ | -0.045 | | |
| *2 | 2.07257 | 0.743 | 1.54488 | 54.87 |
| *3 | -3.00780 | 0.100 | | |
| *4 | -8.40369 | 0.250 | 1.63351 | 23.63 |
| *5 | 4.00004 | 0.559 | | |
| *6 | -1.78418 | 0.650 | 1.54488 | 54.87 |
| *7 | -0.95545 | 0.100 | | |
| *8 | -8.30585 | 0.397 | 1.63351 | 23.63 |
| *9 | -10.11777 | 0.198 | | |
| *10 | 10.65146 | 0.378 | 1.54488 | 54.87 |
| *11 | 1.24681 | 0.500 | | |
| 12 | ∞ | 0.210 | 1.51680 | 64.20 |
| 13 | ∞ | 0.614 | | |
| 14 (imaging plane) | ∞ | | | |

*aspherical surface

TABLE 10

Example 5: Aspherical Surface Data

| Surface Number | KA | A3 | A4 | A5 | A6 |
|---|---|---|---|---|---|
| 2 | -9.2025569E+00 | 0.0000000E+00 | -3.5990526E-02 | 9.1411550E-01 | -2.9799887E+00 |
| 3 | 7.9517335E+00 | 0.0000000E+00 | -5.6984996E-02 | 3.0019403E-01 | -2.0988416E+00 |
| 4 | 1.0950525E+01 | 0.0000000E+00 | 5.1905829E-02 | 4.5746229E-02 | -1.2710359E+00 |
| 5 | -2.0000005E+01 | 0.0000000E+00 | 2.1308376E-01 | -3.3815339E-01 | 5.0457693E-01 |
| 6 | -2.4312215E+00 | 0.0000000E+00 | -5.0322440E-02 | 1.1694075E-02 | 2.7478187E-01 |
| 7 | -2.7486234E+00 | 0.0000000E+00 | -2.1497871E-01 | 2.2122702E-01 | 5.3325250E-02 |

TABLE 10-continued

Example 5: Aspherical Surface Data

| | | | | | |
|---|---|---|---|---|---|
| 8 | −1.9999995E+01 | 0.0000000E+00 | 1.5639684E−01 | −3.1230146E−01 | 3.8832257E−01 |
| 9 | 1.3398206E+01 | 0.0000000E+00 | 2.0843601E−02 | −1.5221930E−01 | 3.0553130E−01 |
| 10 | 1.1470652E+01 | 0.0000000E+00 | −1.4184505E−01 | −8.7702897E−02 | 3.0658147E−01 |
| 11 | −4.1357361E+00 | 0.0000000E+00 | −2.1937131E−01 | 2.2814255E−01 | −1.0731934E−01 |

| | A7 | A8 | A9 |
|---|---|---|---|
| 2 | 4.4354086E+00 | −3.3838361E+00 | 9.1849741E−01 |
| 3 | 4.3150532E+00 | −3.7779373E+00 | 1.2297056E+00 |
| 4 | 2.4020925E+00 | −1.5395320E+00 | 3.5339965E−01 |
| 5 | −7.3338421E−01 | 6.8904497E−01 | −2.1124122E−01 |
| 6 | −3.4423354E−01 | 1.8545251E−01 | −4.6879140E−02 |
| 7 | −2.5497961E−01 | 2.8402806E−01 | −1.0372649E−01 |
| 8 | −3.1396040E−01 | 1.3494397E−01 | −2.2825654E−02 |
| 9 | −2.6634977E−01 | 1.0547833E−01 | −1.5506250E−02 |
| 10 | −2.2762705E−01 | 7.2947256E−02 | −8.8450707E−03 |
| 11 | 2.5055014E−02 | −2.3520886E−03 | −4.1631829E−05 |

TABLE 11

Example 6
f = 3.945, Bf = 1.476, Fno. = 2.40, 2ω = 75.8

| Si | Ri | Di | Ndj | νdj |
|---|---|---|---|---|
| 1 (aperture stop) | ∞ | −0.053 | | |
| *2 | 1.93932 | 0.697 | 1.54488 | 54.87 |
| *3 | −3.60110 | 0.100 | | |
| *4 | −9.17717 | 0.322 | 1.63351 | 23.63 |
| *5 | 3.73720 | 0.594 | | |
| *6 | −1.85854 | 0.650 | 1.54488 | 54.87 |
| *7 | −0.82018 | 0.100 | | |
| *8 | −4.93076 | 0.332 | 1.63351 | 23.63 |
| *9 | −8.82684 | 0.108 | | |
| *10 | 10.81961 | 0.250 | 1.54488 | 54.87 |
| *11 | 1.14012 | 0.500 | | |
| 12 | ∞ | 0.210 | 1.51680 | 64.20 |
| 13 | ∞ | 0.838 | | |
| 14 (imaging plane) | ∞ | | | |

*aspherical surface

TABLE 12

Example 6: Aspherical Surface Data

| Surface Number | KA | A3 | A4 | A5 | A6 |
|---|---|---|---|---|---|
| 2 | −8.7739282E+00 | 0.0000000E+00 | 2.3706634E−02 | 6.9036818E−01 | −2.2720787E+00 |
| 3 | 7.9280189E+00 | 0.0000000E+00 | −3.8663853E−02 | 4.0415448E−01 | −2.7569314E+00 |
| 4 | 1.9307310E+00 | 0.0000000E+00 | 4.9038551E−02 | 1.4601870E−01 | −1.2241953E+00 |
| 5 | −2.0000009E+01 | 0.0000000E+00 | 1.7836924E−01 | −2.3863464E−01 | 5.7783123E−01 |
| 6 | −1.8468914E+00 | 0.0000000E+00 | −8.9579429E−02 | −3.0632250E−02 | 5.2167558E−01 |
| 7 | −2.5915349E+00 | 0.0000000E+00 | −2.5384930E−01 | 2.4533223E−01 | 8.4894622E−02 |
| 8 | −2.0000008E+01 | 0.0000000E+00 | 1.6337874E−01 | −3.1965842E−01 | 4.0936633E−01 |
| 9 | 9.7523433E+00 | 0.0000000E+00 | 1.7474633E−02 | −1.5267353E−01 | 3.2051313E−01 |
| 10 | 1.6008291E+01 | 0.0000000E+00 | −1.4892748E−01 | −8.7562546E−02 | 3.1093648E−01 |
| 11 | −4.6510976E+01 | 0.0000000E+00 | −2.9951508E−01 | 3.4696055E−01 | −1.8441479E−01 |

| | A7 | A8 | A9 |
|---|---|---|---|
| 2 | 3.1618825E+00 | −2.2150636E+00 | 5.0479132E−01 |
| 3 | 5.7636455E+00 | −5.3165853E+00 | 1.8363667E+00 |
| 4 | 2.1161395E+00 | −1.4335151E+00 | 4.1663336E−01 |
| 5 | −9.7400428E−01 | 7.4069802E−01 | −1.3910030E−01 |
| 6 | −7.6481060E−01 | 5.2632734E−01 | −1.6886279E−01 |
| 7 | −2.7766162E−01 | 2.7028017E−01 | −9.5801957E−02 |
| 8 | −3.3786679E−01 | 1.4568983E−01 | −2.4574969E−02 |
| 9 | −2.8081844E−01 | 1.1116018E−01 | −1.6374009E−02 |
| 10 | −2.2888442E−01 | 7.3099420E−02 | −8.9269026E−03 |
| 11 | 4.7268696E−02 | −3.9234996E−03 | −3.3412097E−04 |

TABLE 13

Example 7
f = 3.909, Bf = 1.170, Fno. = 2.40, 2ω = 76.4

| Si | Ri | Di | Ndj | νdj |
|---|---|---|---|---|
| 1 (aperture stop) | ∞ | −0.114 | | |
| *2 | 2.00699 | 0.782 | 1.54488 | 54.87 |
| *3 | −3.06209 | 0.102 | | |
| *4 | −7.23751 | 0.305 | 1.63351 | 23.63 |
| *5 | 4.22966 | 0.467 | | |
| *6 | −1.46757 | 0.453 | 1.54488 | 54.87 |
| *7 | −1.06226 | 0.100 | | |
| *8 | −33.22561 | 0.394 | 1.63351 | 23.63 |
| *9 | −245.96706 | 0.312 | | |
| *10 | 5.05923 | 0.550 | 1.54488 | 54.87 |
| *11 | 1.46783 | 0.500 | | |
| 12 | ∞ | 0.210 | 1.51680 | 64.20 |
| 13 | ∞ | 0.532 | | |
| 14 (imaging plane) | ∞ | | | |

*aspherical surface

TABLE 14

Example 7: Aspherical Surface Data

| Surface Number | KA | A3 | A4 | A5 | A6 |
|---|---|---|---|---|---|
| 2 | −8.8745876E+00 | 0.0000000E+00 | −1.6503152E−02 | 8.3395354E−01 | −2.5971182E+00 |
| 3 | 7.5237733E+00 | 0.0000000E+00 | −2.9250719E−02 | 2.5141911E−01 | −1.7553789E+00 |
| 4 | −2.0000005E+01 | 0.0000000E+00 | 8.6379225E−02 | 8.2639383E−02 | −1.4829539E+00 |
| 5 | −2.0000007E+01 | 0.0000000E+00 | 2.2490019E−01 | −3.2380897E−01 | 5.1927483E−01 |
| 6 | −1.6186042E+00 | 0.0000000E+00 | −3.5223195E−02 | −1.6043872E−02 | 4.7761051E−01 |
| 7 | −3.5511233E+00 | 0.0000000E+00 | −2.7638525E−01 | 2.9647131E−01 | 8.3181862E−02 |
| 8 | −2.0000007E+01 | 0.0000000E+00 | 1.7229206E−01 | −3.8839044E−01 | 5.0323344E−01 |
| 9 | 2.0000009E+01 | 0.0000000E+00 | 1.7331928E−04 | −2.0932579E−01 | 4.6275260E−01 |
| 10 | 4.6168016E+00 | 0.0000000E+00 | −1.9460245E−01 | −1.3858203E−01 | 4.5770968E−01 |
| 11 | −4.9482841E+00 | 0.0000000E+00 | −1.7616580E−01 | 1.6202473E−01 | −6.7435584E−02 |

| Surface Number | A7 | A8 | A9 |
|---|---|---|---|
| 2 | 3.6032650E+00 | −2.5406219E+00 | 6.3075225E−01 |
| 3 | 3.3714603E+00 | −2.7533548E+00 | 8.4634195E−01 |
| 4 | 2.6997139E+00 | −1.7669708E+00 | 4.3307841E−01 |
| 5 | −8.3394954E−01 | 7.6550471E−01 | −2.1163720E−01 |
| 6 | −6.4578307E−01 | 4.2517736E−01 | −1.3899374E−01 |
| 7 | −4.0839633E−01 | 5.3017376E−01 | −2.2680033E−01 |
| 8 | −4.1459313E−01 | 1.8608912E−01 | −3.3776365E−02 |
| 9 | −4.2297352E−01 | 1.7831139E−01 | −2.8477497E−02 |
| 10 | −3.5494081E−01 | 1.2233297E−01 | −1.6315231E−02 |
| 11 | 1.4183206E−02 | −1.4375223E−03 | 4.4010808E−05 |

TABLE 15

Values Related to Conditional Formulae

| Formula | Conditional Expression | Example 1 | Example 2 | Example 3 | Example 4 | Example 5 | Example 6 | Example 7 |
|---|---|---|---|---|---|---|---|---|
| 1 | f/f3 | 1.38 | 0.80 | 1.69 | 0.82 | 1.29 | 1.79 | 0.77 |
| 2 | (L5f − L5r)/(L5f + L5r) | 0.81 | 0.69 | 0.83 | 0.70 | 0.79 | 0.81 | 0.55 |
| 3 | (L1f + L1r)/(L1f − L1r) | −0.202 | −0.202 | −0.202 | −0.208 | −0.184 | −0.300 | −0.208 |
| 4 | f · P45 | 0.46 | 0.33 | 0.45 | 0.31 | 0.43 | 0.48 | 0.43 |
| 5 | f · tanω/L5r | 2.6 | 2.0 | 2.8 | 2.1 | 2.5 | 2.7 | 2.1 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient $K_m$ and the measured data, using a fitting function of UA3P. $C=1/R_m$ and $KA=K_m-1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C., using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number νd with respect to the d line is obtained by calculations, substituting the values of Nd, NF, and NC obtained by the above measurements into the formula below.

$$\nu d = (Nd-1)/(NF-NC)$$

What is claimed is:

1. An imaging lens substantially consisting of five lenses, including:
   a first lens having a positive refractive power and a convex surface toward the object side;
   a second lens having a biconcave shape;
   a third lens having a positive refractive power and is of a meniscus shape having a concave surface toward the object side;
   a fourth lens having a concave surface toward the object side; and
   a fifth lens having a negative refractive power and is of a meniscus shape having a convex surface toward the object side, provided in this order from the object side;
   the imaging lens satisfying the following conditional formula:

$$0.75 < f/f3 < 1.85 \quad (1)$$

wherein f is the focal length of the entire system, and f3 is the focal length of the third lens.

2. An imaging lens as defined in claim 1, wherein: the fourth lens has a negative refractive power.

3. An imaging lens as defined in claim 1, wherein: the first lens is of a biconvex shape.

4. An imaging lens as defined in claim 1, wherein: the fourth lens is of a meniscus shape having a concave surface toward the object side.

5. An imaging lens as defined in claim 1 that further satisfies the following conditional formula:

$$0.5 < (L5f-L5r)/(L5f+L5r) < 0.9 \quad (2)$$

wherein L5f is the paraxial radius of curvature of the surface of the fifth lens toward the object side, and L5r is the paraxial radius of curvature of the surface of the fifth lens toward the image side.

6. An imaging lens as defined in claim 1 that further satisfies the following conditional formula:

$$-0.33 < (L1f+L1r)/(L1f-L1r) < -0.17 \quad (3)$$

wherein L1f is the paraxial radius of curvature of the surface of the first lens toward the object side, and L1r is the paraxial radius of curvature of the surface of the first lens toward the image side.

7. An imaging lens as defined in claim 1 that further satisfies the following conditional formula:

$$0 < f \cdot P45 < 0.55 \quad (4)$$

wherein f is the focal length of the entire system, P45 is the refractive power of an air lens formed between the surface of the fourth lens toward the image side and the surface of the fifth lens toward the object side, the refractive power of the air lens being obtained by Formula (P) below:

$$P45 = \frac{1-Nd4}{L4r} + \frac{Nd5-1}{L5f} - \frac{(1-Nd4) \times (Nd5-1) \times D9}{L4r \times L5f} \quad (P)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

8. An imaging lens as defined in claim 1 that further satisfies the following conditional formula:

$$0.5 < f \tan \omega / L5r < 20 \quad (5)$$

wherein ω is half the maximum angle of view when focused on an object at infinity, and L5r is the paraxial radius of curvature of the surface of the fifth lens toward the image side.

9. An imaging lens as defined in claim 1 that further satisfies the following conditional formula:

$$0.76 < f/f3 < 1.8 \quad (1\text{-}1).$$

10. An imaging lens as defined in claim 1 that further satisfies the following conditional formula:

$$0.52 < (L5f-L5r)/(L5f+L5r) < 0.87 \quad (2\text{-}1)$$

wherein L5f is the paraxial radius of curvature of the surface of the fifth lens toward the object side, and L5r is the paraxial radius of curvature of the surface of the fifth lens toward the image side.

11. An imaging lens as defined in claim 1 that further satisfies the following conditional formula:

$$-0.31 < (L1f+L1r)/(L1f-L1r) < -0.18 \quad (3\text{-}1)$$

wherein L1f is the paraxial radius of curvature of the surface of the first lens toward the object side, and L1r is the paraxial radius of curvature of the surface of the first lens toward the image side.

12. An imaging lens as defined in claim 1 that further satisfies the following conditional formula:

$$0.2 < f \cdot P45 < 0.51 \quad (4\text{-}1)$$

wherein f is the focal length of the entire system, P45 is the refractive power of an air lens formed between the surface of the fourth lens toward the image side and the surface of the fifth lens toward the object side, the refractive power of the air lens being obtained by Formula (P) below:

$$P45 = \frac{1-Nd4}{L4r} + \frac{Nd5-1}{L5f} - \frac{(1-Nd4) \times (Nd5-1) \times D9}{L4r \times L5f} \quad (P)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

13. An imaging lens as defined in claim 1 that further satisfies the following conditional formula:

$$0.7 < f \cdot \tan\omega / L5r < 10 \qquad (5\text{-}1)$$

wherein ω is half the maximum angle of view when focused on an object at infinity, and L5r is the paraxial radius of curvature of the surface of the fifth lens toward the image side.

14. An imaging lens as defined in claim 1, wherein:
an aperture stop is positioned at the object side of the surface of the second lens toward the object side.

15. An imaging lens as defined in claim 14, wherein:
the aperture stop is positioned at the image side of the apex of the surface of the first lens toward the object side.

16. An imaging lens as defined in claim 1 that further satisfies the following conditional formula:

$$0.54 < (L5f - L5r)/(L5f + L5r) < 0.85 \qquad (2\text{-}2)$$

wherein L5f is the paraxial radius of curvature of the surface of the fifth lens toward the object side, and L5r is the paraxial radius of curvature of the surface of the fifth lens toward the image side.

17. An imaging lens as defined in claim 1 that further satisfies the following conditional formula:

$$0.3 < f \cdot P45 < 0.49 \qquad (4\text{-}2)$$

wherein f is the focal length of the entire system, P45 is the refractive power of an air lens formed between the surface of the fourth lens toward the image side and the surface of the fifth lens toward the object side, the refractive power of the air lens being obtained by Formula (P) below:

$$P45 = \frac{1 - Nd4}{L4r} + \frac{Nd5 - 1}{L5f} - \frac{(1 - Nd4) \times (Nd5 - 1) \times D9}{L4r \times L5f} \qquad (P)$$

wherein Nd4 is the refractive index of the fourth lens with respect to the d line, Nd5 is the refractive index of the fifth lens with respect to the d line, L4r is the paraxial radius of curvature of the surface of the fourth lens toward the image side, L5f is the paraxial radius of curvature of the surface of the fifth lens toward the object side, and D9 is an air space distance between the fourth lens and the fifth lens along the optical axis.

18. An imaging lens as defined in claim 1 that further satisfies the following conditional formula:

$$1 < f \cdot \tan\omega / L5r < 5 \qquad (5\text{-}2)$$

wherein ω is half the maximum angle of view when focused on an object at infinity, and L5r is the paraxial radius of curvature of the surface of the fifth lens toward the image side.

19. An imaging apparatus equipped with an imaging lens as defined in claim 1.

* * * * *